United States Patent
Yaman et al.

(10) Patent No.: US 12,332,394 B2
(45) Date of Patent: Jun. 17, 2025

(54) FIBER SENSING USING SUPERVISORY PATH OF SUBMARINE CABLES

(71) Applicant: NEC Laboratories America, Inc., Princeton, NJ (US)

(72) Inventors: Fatih Yaman, Princeton, NJ (US); Yue-Kai Huang, Princeton, NJ (US); Ezra Ip, West Windsor, NJ (US); Hussam Batshon, Monroe, NJ (US); Eduardo Mateo Rodriguez, Tokyo (JP); Kohei Nakamura, Tokyo (JP); Takanori Inoue, Tokyo (JP); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 17/829,284

(22) Filed: May 31, 2022

(65) Prior Publication Data

US 2022/0381932 A1   Dec. 1, 2022

Related U.S. Application Data

(60) Provisional application No. 63/195,305, filed on Jun. 1, 2021.

(51) Int. Cl.
  *G01V 1/22* (2006.01)
  *G01V 1/01* (2024.01)
  *H04B 10/25* (2013.01)

(52) U.S. Cl.
  CPC .............. *G01V 1/01* (2024.01); *G01V 1/226* (2013.01); *H04B 10/25* (2013.01)

(58) Field of Classification Search
  CPC ........... G01V 1/01; G01V 1/226; H04B 10/25
  See application file for complete search history.

(56) References Cited

U.S. PATENT DOCUMENTS

| | | | |
|---|---|---|---|
| 6,462,549 B1 | 10/2002 | Curtis et al. | |
| 7,961,331 B2 * | 6/2011 | Healey | G01H 9/004 356/73.1 |
| 2005/0184260 A1 * | 8/2005 | Fageraas | G01V 1/22 250/573 |
| 2005/0196174 A1 * | 9/2005 | Evangelides | H04B 10/0771 398/151 |

(Continued)

*Primary Examiner* — David J Bolduc
(74) *Attorney, Agent, or Firm* — Joseph Kolodka

(57) ABSTRACT

Earthquake detection via fiber sensing is provided using using a supervisory path of submarine cables wherein the supervisory system/path of a submarine optical cable conveys portion(s) of an optical signal back to an origin location periodically—i.e., at every repeater location. Advantageously, since it is known where a returning signal is coming from, a resolution equivalent to an undersea span length may be determined—which is sufficient for wide area disturbances such as earthquakes. The returned signal is sufficiently strong such that the signal-to-noise ratio of a returned/received signal is not limited by the ASE noise of the amplifiers. The returned signal is much larger as compared to a normal distributed acoustic sensing (DAS) return signal since the return signal according to aspects of the present disclosure is directed backward via an optical coupler/reflector/circulator having a much larger coupling ratio as compared to normal Rayleigh back scattering utilized in DAS.

1 Claim, 20 Drawing Sheets

(56) References Cited

U.S. PATENT DOCUMENTS

| | | | | |
|---|---|---|---|---|
| 2008/0123467 | A1* | 5/2008 | Ronnekleiv | G01V 1/201 |
| | | | | 367/20 |
| 2009/0135428 | A1* | 5/2009 | Healey | G01H 9/004 |
| | | | | 356/477 |
| 2013/0113629 | A1* | 5/2013 | Hartog | G01V 1/226 |
| | | | | 340/853.2 |
| 2013/0194105 | A1* | 8/2013 | Nash | B23Q 3/1546 |
| | | | | 340/850 |
| 2014/0063493 | A1* | 3/2014 | Nash | G01V 1/3808 |
| | | | | 356/226 |
| 2015/0114127 | A1* | 4/2015 | Barfoot | G01H 9/004 |
| | | | | 73/655 |
| 2017/0018174 | A1* | 1/2017 | Gerszberg | H04B 10/112 |
| 2017/0260849 | A1* | 9/2017 | Friehauf | E21B 43/26 |
| 2018/0238732 | A1* | 8/2018 | Suh | G01V 1/22 |
| 2018/0294903 | A1* | 10/2018 | Goodman | H04W 24/06 |
| 2019/0260468 | A1* | 8/2019 | Xu | H04B 10/035 |
| 2020/0209417 | A1* | 7/2020 | Englund | G01V 1/38 |
| 2020/0313763 | A1* | 10/2020 | Wang | H04B 10/25753 |
| 2021/0041586 | A1* | 2/2021 | Aanensen | G01V 1/247 |
| 2021/0167850 | A1* | 6/2021 | Schmogrow | H04B 10/07955 |
| 2021/0255344 | A1* | 8/2021 | Kamalov | G01V 1/307 |
| 2021/0266065 | A1* | 8/2021 | Wang | G01D 5/35358 |
| 2021/0343141 | A1* | 11/2021 | Duval | G01V 1/01 |
| 2022/0171081 | A1* | 6/2022 | Le | H04J 14/02 |
| 2022/0205866 | A1* | 6/2022 | Mohs | H01S 3/06787 |
| 2022/0397448 | A1* | 12/2022 | Pilipetskii | H04B 10/071 |

* cited by examiner

| Parameter | Notation | Expression | Example |
|---|---|---|---|
| Speed of light | $c$ | | 299792 km/s |
| Fiber glass refractive index | $n_r$ | | 1.46 |
| Span length | $L_{sp}$ | | 90 km |
| Number of spans | $N_{sp}$ | | 120 |
| Time of flight for light to cross a span and back | $T_{sp}$ | $T_{sp} = L_{sp}/(cn_r)$ | 0.438 ms |
| Time of flight for light to cross entire link and back | $T_L$ | $T_L = N_{sp}T_{sp}$ | 105.12 ms |
| Pulse width | $T_w$ | | 0.1 ms |
| Fundamental Pulse period | $T_p$ | $T_p \geq 2T_L$ | 105.12 ms |

FIG. 2(B)

FIBER SENSING USING SUPERVISORY PATH OF SUBMARINE CABLES

CROSS REFERENCE TO RELATED APPLCIATIONS

This application claims the benefit of Untied States Provisional Patent Application Ser. No. 63/195,305 filed 1, Jun. 2021 the entire contents of each is incorporated by reference as if set forth at length herein.

TECHNICAL FIELD

This disclosure relates generally to fiber optic sensing (FOS) systems methods and structures. More particularly, it describes FOS systems and methods that provide fiber sensing using supervisory path of submarine cables.

BACKGROUND

As those skilled in the art will readily appreciate, fiber optic sensing systems and methods have shown to be of great utility and provide a range of useful services such as sensing various physical parameters including temperature, vibration, strain, etc., thereby enabling a new era of infrastructure monitoring. Given this established utility, systems, methods, and structures for earthquake detection via fiber sensing would represent a welcome addition to the art.

SUMMARY

An advance in the art is made according to aspects of the present disclosure directed to FOS systems, methods and structures that provide earthquake detection via fiber sensing.

In sharp contrast to the prior art, systems, methods, and structures according to aspects of the present disclosure senses/detects earthquakes via fiber sensing using a supervisory path of submarine cables.

Viewed from one aspect, the supervisory system/path of the submarine optical cable conveys portion(s) of an optical interrogation signal back to an origin location periodically—i.e., at every repeater location. Advantageously, since it is known where a returning signal is coming from, a resolution equivalent to an undersea span length may be determined—which is sufficient for wide area disturbances such as earthquakes. Additionally, the returned signal is sufficiently strong such that the signal-to-noise ratio of a returned/received signal is not limited by the ASE noise of the amplifiers. Of further advantage, a returned signal is much larger as compared to a normal DAS return signal since the return signal according to aspects of the present disclosure is directed backward via an optical coupler/reflector/circulator having a much larger coupling ratio as compared to normal Rayleigh back scattering.

Viewed from another aspect, systems, methods, and structures according to aspects of the present disclosure increase a sampling rate of earthquake signals, or other disturbances being monitored under water as our inventive system exhibits a wide bandwidth. Finally, systems, methods, and structures according to aspects of the present disclosure employ a sensing system exhibiting a double-pulse double-differentiation operation that is much more robust to large environmental noises. Such an inventive technique reduces the requirement to use very low noise lasers, which those skilled in the art will appreciate may be quite expensive to implement in scale.

BRIEF DESCRIPTION OF THE DRAWING

A more complete understanding of the present disclosure may be realized by reference to the accompanying drawing in which:

FIG. 2(B) shows notational examples employed in the example of FIG. 2(A) according to aspects of the present disclosure;

Figure 1:
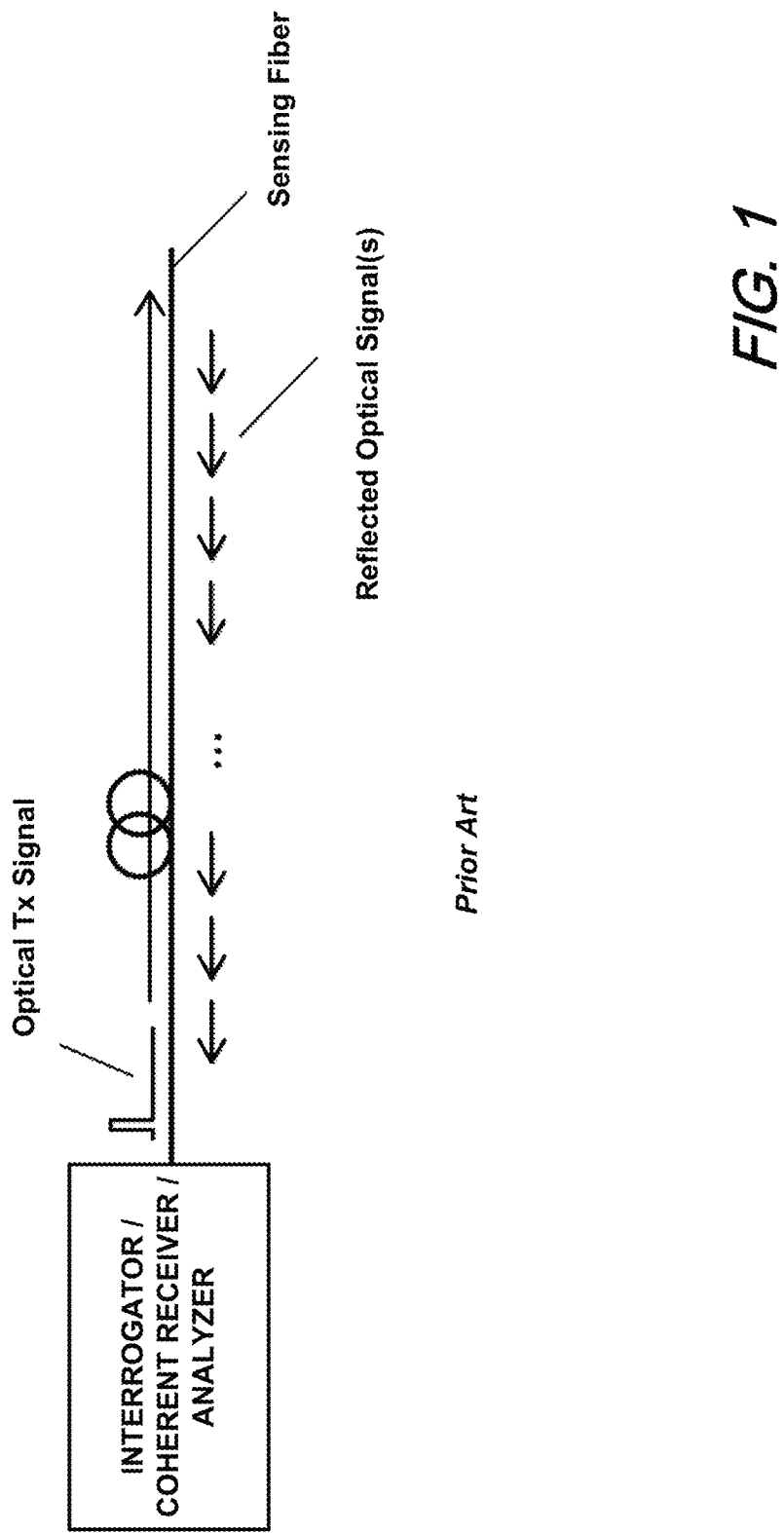
FIG. 1 is a schematic diagram of an illustrative distributed fiber optic sensing system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a distributed fiber optic sensing system including artificial intelligence analysis and cloud storage/service is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters), Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had, time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically haft of the pulse rate. As higher frequencies are attenuated very quickly, most of the relevant ones to detect and classify events are in the lower of the 2 kHz range.

As we shall show and describe and as already noted, our inventive systems and methods automatically detect/interpret vibration signals resulting from FOS operation using deployed fiber optic sensor cables to detect/locate cable vibrations caused by—for example—earthquakes using deployed undersea/submarine optical fiber cables. Advantageously, our inventive systems, methods, and structures may employ a supervisory path of the optical fiber cable.

As those skilled in the art will readily understand and appreciate, in fiber optical telecommunication, optical signals are transmitted over optical fibers. Modern optical fibers are very good at transmitting optical signals without causing large distortions or attenuation to the signal. At the same time optical fibers are sensitive to disturbance impacted on them. Disturbance on the fiber causes a change in the phase and polarization of the light traveling through the fiber.

In submarine systems, optical cables that encloses the optical fibers lay at the ocean bottom. In some parts they may be buried. The ocean bottom usually is very quiet, in the sense that there are not many disturbances such as noise from human activity. As such in the absence of major effects such as earthquake, subsea landslide, volcanic activity, the light traveling in the fiber would not be disturbed appreciably. When earthquake occurs, for example, the phase and polarization of light is modified at the location of the disturbance (earthquake). As such, by monitoring the phase and polarization of the light, information regarding an earthquake (or other undersea disturbance) can be obtained.

Current methods of earthquake sensing at the ocean bottom using optical cables are limited by their general inability to locate precisely where an earthquake occurred and their lack of sufficient signal-to-noise characteristic to be able to sense an earthquake over the entire length of the cable which—as those skilled in the art will readily understand—can be thousands of kms long.

Advantageously, systems, methods, and structures according to aspects of the present disclosure may provide earthquake sensing over transoceanic distances, and locate a disturbance within a span length (as described below) of the undersea optical fiber cable. Of further advantage, systems, methods and structures according to aspects of the present disclosure use existing submarine cable installations and designs and therefore requires no substantial modification to the cable of systems—which can be quite costly.

As those skilled in the art will understand and appreciate, submarine (undersea) cables are the backbone of modern telecommunications. Nearly all data that travels between continents is delivered via undersea cables located on the seabed.

As is known further, there are at least several characteristics of submarine/undersea transmission that sets it apart from other fiber communication systems First, they are very long, as they typically connects different continents. Second, it is very expensive to lay optical fiber cables underwater at ocean depths. Once an optical cable is so laid, it is extremely expensive to retrieve, replace, upgrade, and/or repair deployed cables. As such, even small degradations in transmission characteristics of undersea optical fiber accumulate and cause reductions of available transmission capacity. Since these systems are very expensive to lay and difficult to repair/upgrade afterwards, it is very important to correctly characterize all the limitations to the capacity accurately and simply.

Still another distinguishing characteristic of submarine cables is that they generally require—and exhibit—a so called "supervisory system". Such supervisory system is typically optics-based and is employed to monitor the health and operation of the undersea optical cable. Since undersea optical cable becomes nearly inaccessible without damaging it once it is laid on the ocean floor, it is most important to monitor its health from its two land ends. Such monitoring of contemporary optical cable health is generally achieved via the supervisory system. As noted, our inventive systems, methods, and structures according to aspects of the present disclosure employ such a supervisory facility to detect undersea activity—and particularly earthquakes.

We note that while there exist alternative, known systems and methods to sensing earthquakes and other undersea seismic activity, our inventive systems and methods—using existing, deployed submarine cables for earthquake sensing has several attractive features that are not met in the art. First, such systems are already deployed, and they can be used for sensing without degrading their intended purpose/function of carrying telecommunications traffic. Second, such undersea systems generally extend between continents and as such can advantageously and simultaneously monitor many remote locations that would be challenging and/or difficult to normally access/monitor. Third, since such systems employ telecommunication cables, they provide ready infrastructure to quickly convey earthquake, tsunami, and/or seismic or other data.

As those skilled in the art will understand and appreciate with respect to undersea optical transmission systems, data to be transmitted originates in one of a number of cable stations. It is delivered to other cable stations through the submarine cable. Generally, submarine optical cables have two parts. 1) a cable span, and 2) repeaters. The cable span can be 40 km to 150 km or longer, but typically in the 50-80 km range. These are sometimes also referred to just as the spans. Note that a cable span typically includes several elements, however the component of major interest for our purposes regarding the cable span is the optical fiber cable itself Of course, optical fibers are very thin strands of glass that can guide light in them with low attenuation. Optical fibers are very thin, with about 250 microns diameters typically. Fibers are made of pure silica glass with a cylindrical shape. Light is guided through a doped center called the core surrounded by the remaining glass called the cladding. Typically, the core diameter is of the order of 5-12 micrometers, and the cladding diameter is about 125 micrometers. The glass section is further coated by polymers to protect it which typically brings the overall diameter to 250 micrometers.

In general cables can house a multitude of fibers. Each fiber can carry additional data. The data capacity is therefore proportional to the number of fibers in the cable. Since the fibers are very thin, in principal the capacity of the cable can be increased dramatically by adding more fibers. However, this is not the case because of the power limitation.

Optical fibers generally have low attenuation. With such attenuation, the optical power can drop to 1% after only 1 span. Therefore, after one span, light needs to be amplified. Amplification is done by active components called amplifiers. Amplifiers add noise during amplification which is largely unavoidable. By far the dominant noise added by the amplifiers is the amplifies spontaneous emission (ASE) noise.

Amplifiers are housed in a second main part of submarine cable system called repeaters. Inside the repeaters there are typically one amplifier dedicated to each fiber. One of the limitations to the number of fibers that can be supported by the cable system is the number of amplifiers that can physically fit into the repeater. The other limitation is the limited electrical power available at an undersea repeater station. Each amplifier uses electricity, to amplify the optical power which basically transfers energy to the light traversing the optical fibers. As mentioned earlier, this electrical power has to be supplied from each end of the cable system which can be several thousand km long.

To better understand and differentiate our inventive fiber optic earthquake sensing systems, methods and structures according to aspects of the present disclosure we note here some of the relevant prior art. Some of the problems we are solving are the shortcomings of the prior art. As will be understood and appreciated by those skilled in the art, there are two main foci of technology used for earthquake sensing namely, a forwarding technique and a back scattering technique.

The forwarding technique has the advantage of operating over a very long range. It senses over a cable system that is potentially thousands of kms in length. However, such forwarding technique does not provide information about where a disturbance occurs.

Conversely, the scattering based technique exhibits a very good resolution and can pinpoint the location of a disturbance to distances within centimeters. Despite such attractive resolution, the sensing range is very limited—typically to a single span of optical fiber cable. In some situations, the range may be extended to a few spans.

The forwarding technique can rely on either sensing the phase modulation or polarization modulation induced by the disturbance. Typically, light output from a stable laser is directed into the optical fiber from one end of that fiber, and any modulation of the light is monitored at the other end of the fiber. As will be appreciated, the measured modulated light always mov in the forward direction. In some arrangements, the light is looped back at a far end station to return back to the originating station. Notwithstanding such loop-back, the light is always moving forward. As a result, at the end of the link the measured modulation is the accumulation of all the modulations induced by all the disturbances along the link. Therefore, the location of the disturbance cannot be retrieved.

The scattering technique relies on a part of the signal being continuously scattered back to the origin continuously along the fiber such as that described previously with respect to DFOS. Fibers, while optically precise, still exhibit imperfections along a length—such as glass density fluctuations. These fluctuations cause a small fraction of light to be scattered in all directions. Part of this scattering in the backward direction is captured by the fiber, and travels backwards with respect to the direction of the original light. This scattering can be used to sense the disturbance, but more importantly it can pinpoint where the disturbance is occurring. As noted previously, systems using this scattering for sensing are oftentimes called distributed acoustic sensing (DAS) systems or distributed vibration sensing (DVS)—collectively DFOS.

Unfortunately for our purposes herein however, Rayleigh back scattering is very small. In the range of −40 dB per kilometer of fiber at the typical communication wavelength band around 1550 nm. The small amount of power scattered/reflected by the Rayleigh scattering is buried under ASE noise generated by transmission amplifiers in the repeaters. As a result, DFOS systems can only have enough signal-to-noise ratio to meaningfully sense earthquake in short distances. To be more specific—in submarine transmission systems—the repeaters guide light only in one direction, and isolators block the light traveling in the opposite direction for proper operation of amplifiers. Typically, there are small couplers that bypass these isolators to guide the reflected light into the returning fiber with high losses called loop-back couplers. When the small reflection efficiency of Rayleigh scattering and the high coupling losses of the loop-back couplers, the scattered power returning to the origin is too small for our purposes and generally limits the range of the DFOS/DAS to a single span, and in some cases to a few spans at most.

We note that, in most submarine cables, the loop-back couplers have two purposes. One of them is to couple the light reflected by the Rayleigh scattering and combine it with the fiber carrying traffic in the opposite direction. The other purpose is to create a path for what is sometimes called the supervisory signal. Supervisory signals are typically separate from the communication channels. These signals are typically pulses at a predesignated wavelength. As they travel along the fiber together with the signal, at every repeater a small part of this supervisory signal is diverted back towards the origin by combining them into the fiber carrying the traffic towards the origin. As such, the path taken by the supervisory signal will be called the supervisory path which the loop-back couplers are a part.

As we shall show and describe, our inventive systems, methods, and structures according to aspects of the present disclosure overcome the range and resolution infirmities of the prior art without imposing additional, significant costs to the deployed infrastructure.

Figure 2A:
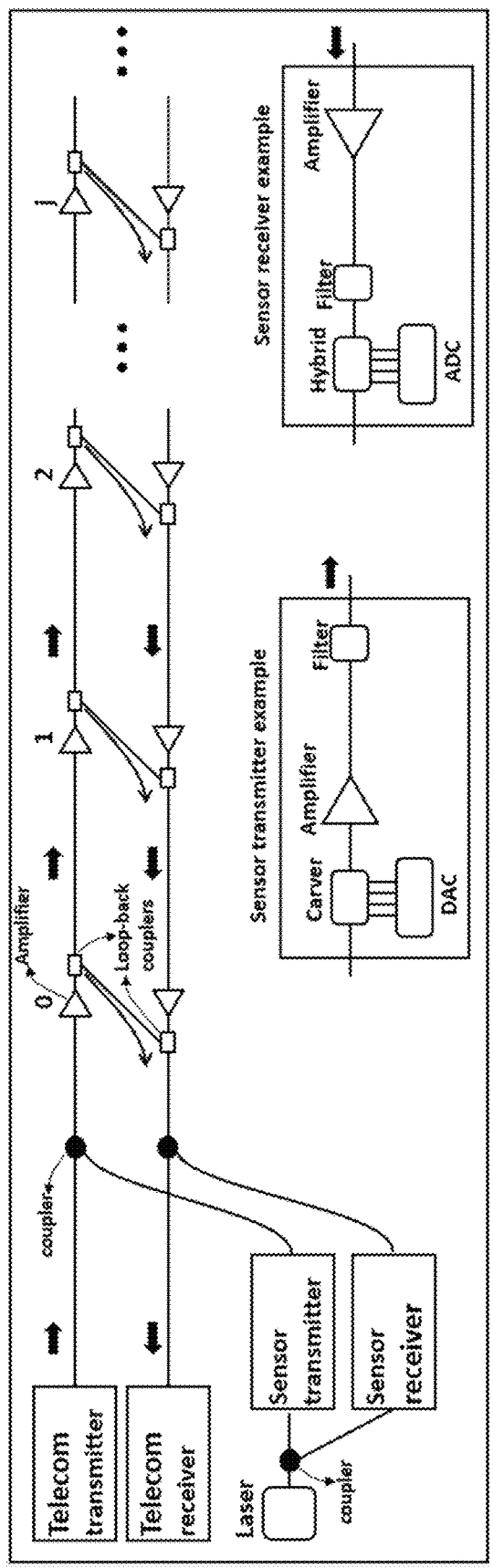
FIG. 2(A) is a schematic diagram illustrating a submarine transmission system together with a vibration sensor wherein the sensor has a transmitter side and a receiver side that shares the same laser.

FIG. 2(A) shows an example of a submarine system together with an earthquake sensor (sensor as used herein) wherein the sensor has a transmitter and a receiver side that shares a common (same) laser. Examples of transmitter and receiver blocks are also shown.

Typically, submarine transmission cables contain more than a few fiber pairs. The pairs are designed in such a way that one of them carries traffic from one landing station (A) to another landing station (B), and the other carries the return traffic from landing station B to landing station B. Oftentimes, such fiber runs are referred to as East-to-West fiber, and West-to-East fiber. For our purposes herein, we will refer to one as a forward fiber, and another as a returning fiber—which may be indicative of the direction of light conveyed by the respective fiber. The forward and backward fibers are collectively referred to as a fiber pair. We sometimes refer to the jth fiber pair meaning the jth forward fiber and the jth backward fiber. In FIG. 2(A), one line shows the forward fiber. In the optical path of that forward fiber, amplifiers include isolators which results in optical traffic flowing only in one direction therethrough an individual amplifier.

Typically, submarine systems also include a supervisory system, not shown in FIG. 2(A). The supervisory system generally includes a remote fiber testing equipment (RFTE) (also not shown in figure). The RFTE box sends a light signal at a designated band along with the telecom signal. At each repeater location—which is where the amplifiers are located—a portion of this RFTE signal is separated and routed through loop-back couplers into the returning fiber as shown in FIG. 2(A).

As an example, if an optical pulse is generated and directed into an optical fiber, a portion of this pulse is sent back after each amplifier to the RFTE equipment. Based on this returned signal, the RFTE monitors the health of the undersea/submarine transmission system.

As will be appreciated, the loop-back-couplers can be any of a different variety. They could be simple couplers, wavelength dependent couplers, recirculators, reflectors, or a combination of one or more of these components. Nevertheless, functionally, they operate similarly, in the sense that they take a portion of the signal and route it to the returning path. To avoid excess loss to the optical (telecommunications) signals, and other concerns, the RFTE signal experiences a large loss at the loop-back-coupling stage. This loop-back loss can be 20 dB or higher.

According to an aspect of the present disclosure, our sensor employs the same supervisory path. As an example, if the loop-back couplers only allow a certain band to be reflected, the sensor laser operates at that wavelength. In some cases, the sensor may operate alongside the RFTE box, and in some cases the sensor also combines the supervisory functionality with sensing functionality.

An example of an illustrative sensor is shown in FIG. 2(A). FIG. 2(B) shows notational examples employed in the example. It includes a transmitter and a receiver which share the same laser. At the transmitter the light output from the laser is directed into and traverses a carver that creates a pulse which is amplified and optionally filtered using an optical band-pass filter. Note that some specific designs/implementations may include polarization control equipment. The receiver is a self-homodyne coherent receiver and it may include an optical amplifier and an optical band-pass filter at its input. The incoming signal is mixed with the laser light that acts as a local oscillator at the hybrid. The 2 quadratures (real and imaginary) of the beating signal in two polarizations are sampled by an analog to digital convertor. The signal is then digitally processed.

The transmitter carves a pulse of width T. The width of the pulse should be less than twice the time of flight for light to travel a single span, i.e, $T_W \leq 2T_{sp}$. Here we assume for simplicity that all the span lengths are equal. In case they are not $T_w$ should be smaller than the shortest twice the shortest span time of flight. The transmitter sends the pulse periodically at a period of $T_p$. This period should be longer than or equal to the twice the total time of flight for light to travel the entire link. In other words, the time it takes light to travel to the end of the link and return to the sensor receiver, i.e., $T_p \geq 2T_L$.

Figure 3:
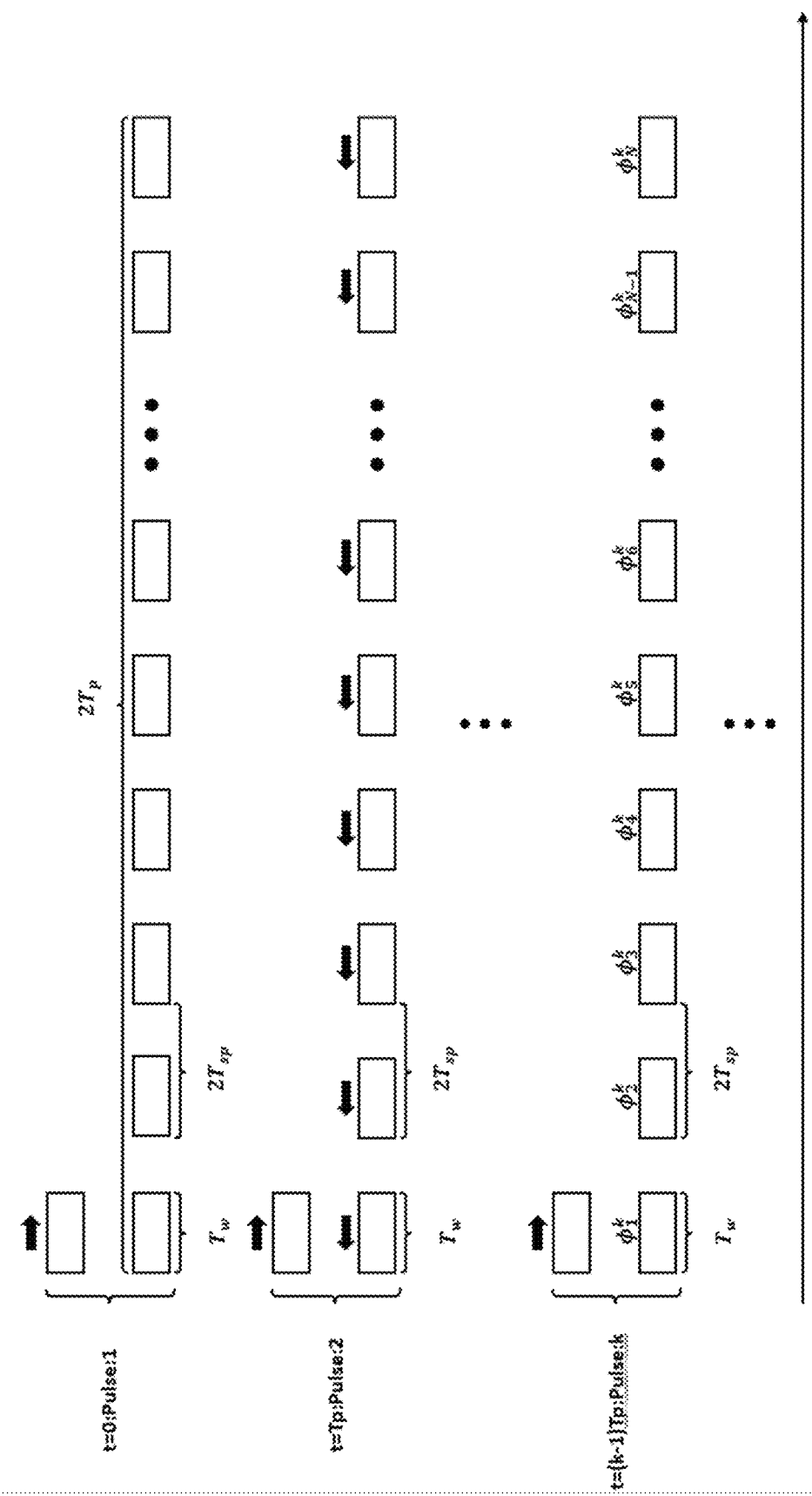
FIG. 3 is a schematic flow diagram illustrating a pulse train sent by sensor transmitter and the returning pulse trains according to aspects of the present disclosure.

FIG. 3 is a schematic diagram illustrating a pulse train sent by sensor transmitter and returning pulse trains wherein the x-axis shows the arrival time of the returning pulses to the receiver. As may be understood from reference to this figure, assuming a link with equal length for each of its spans for simplicity, each transmitted pulse causes $N_{sp}$ pulses returning to the Sensor receiver separated by $T_{sp}$ where $N_{sp}$ is the total number of spans. For example, the kth transmitted pulse produces the kth train of returning pulses. In the kth train of returning pulses, the particular pulses are returning from the jth amplifier. In our definitions as shown by FIG. 2, we identify the amplifiers starting from zero count, but the spans starting from 1. For example, span1 is situated between amplifier 0 and amplifier 1.

A returning pulse train is received at the sensor coherently. The phases of pulses are recovered digitally. In our notation, the pulse returning from the jth amplifier in the kth pulse train returns with an accumulated phase of $\phi_j^k$. We can express this phase as follows:

$$\phi_j^k = \Sigma_1^j \Phi_j^k \phi_L(kT_p) - \phi_L(kT_p + j2T_{sp}) \quad (1)$$

where $\Phi_j^k$ is the total phase imparted by the jth span only on the kth pulse train, and $\phi_L$ (t) is the laser phase noise at time t. Note that the $\phi_L(kT_p)$ is the laser phase noise imparted to the pulse at the transmitter side when the pulse is created on the carrier laser and $\phi_L(kT_p+j2T_{sp})$ appears as the same laser acts as the local oscillator at the receiver, and the pulse phase is referenced to this laser in coherent detection.

This is the laser phase at a delayed time that took the pulse to travel to the jth repeater and come back to the sensor. This phase includes the phase imparted by the forward and returning jth span. To make the notation clear, $\phi_j^k$ is the total phase accumulated up until the sensor receiver, which is the sum of the phases imparted by all the traversed fiber spans. It should be noted that the laser phase noise $\phi_L$ (t) as defined here includes not only the phase noise that is intrinsic to the laser, but also the phase noise the laser picks up from its environment, typically the landing station that the Sensor equipment is housed at, up until the first fiber span. This is a crucial point as the environmental noise picked up at the landing station can be large enough to be the ultimate limitation.

By subtracting the phase of one pulse from the adjacent pulse we obtain a differential phase between the adjacent spans as follows:

$$\delta\phi_j^k = \phi_j^k - \phi_{j+1}^k = \Phi_j^k - [\phi_L(kT_p+j2T_{sp}) + \phi_L(kT_p+(j+1)2T_{sp})] \quad (2)$$

Equation [2] is the central result showing the possibility of monitoring disturbance on submarine cables span by span. $\delta\phi_j^k$ is the measured quantity and it is related to t which is related to the phase imparted by the jth span when the kth pulse is transmitted except for an additional noise terms that is caused by the laser phase noise which is shown in the square brackets. Equation [2] shows that as long as the laser phase noise is low enough the phase noise imparted by the fiber spans can be measured. We call this scheme the single-differential scheme, because $\delta\phi_j^k$ is obtained by taking a differential between the phases of the consecutive pulses. This is in contrast to another scheme we will discuss below that we call the double-differential scheme.

As explained above, in the absence of major disturbance, the ocean bottom is expected to be stable and quite enough that $\Phi_j^k$ would remain small and change slowly. When there is a major disturbance, $\Phi_j^k$ would change significantly from once pulse train to the other, in other words for different values of k.

Earthquakes can create large disturbances, however their frequency contents are quite slow, in the range 0.2-10 Hz. Therefore if we consider the example of an earthquake hitting the location where the jth span is located, the phase imparted to the jth span will change at the rate of the earthquake vibration.

Considering the example with the numbers considered above where the transmitted pulse period $T_p$=105 ms, we can monitor $\Phi_j^k$ at the sampling rate of ~9 Hz. This means, we can faithfully reconstruct the earthquake signal up to 4.5 Hz. In some cases, we may want to increase the sampling rate so that we can accurately reconstruct the earthquake signal at a much higher frequency. These can be achieved in many different ways. We propose three examples. 1) Time-domain multiplexing (TDM) 2) Frequency domain multiplexing (FDM) and 3) Mixed-domain multiplexing (MDM).

Figure 4A:
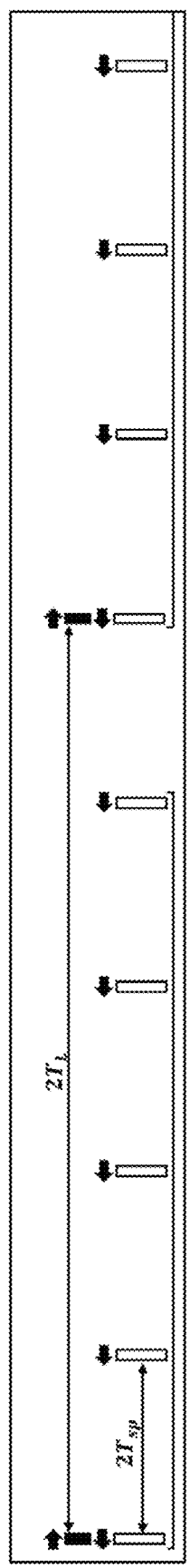
FIG. 4(A) is a schematic illustrating the pulse train sent by the sensor transmitter and the returning pulse trains and FIG. 4(B) is a schematic illustrating the time-domain multiplexing to increase sampling rate according to aspects of the present disclosure.
Figure 4B:
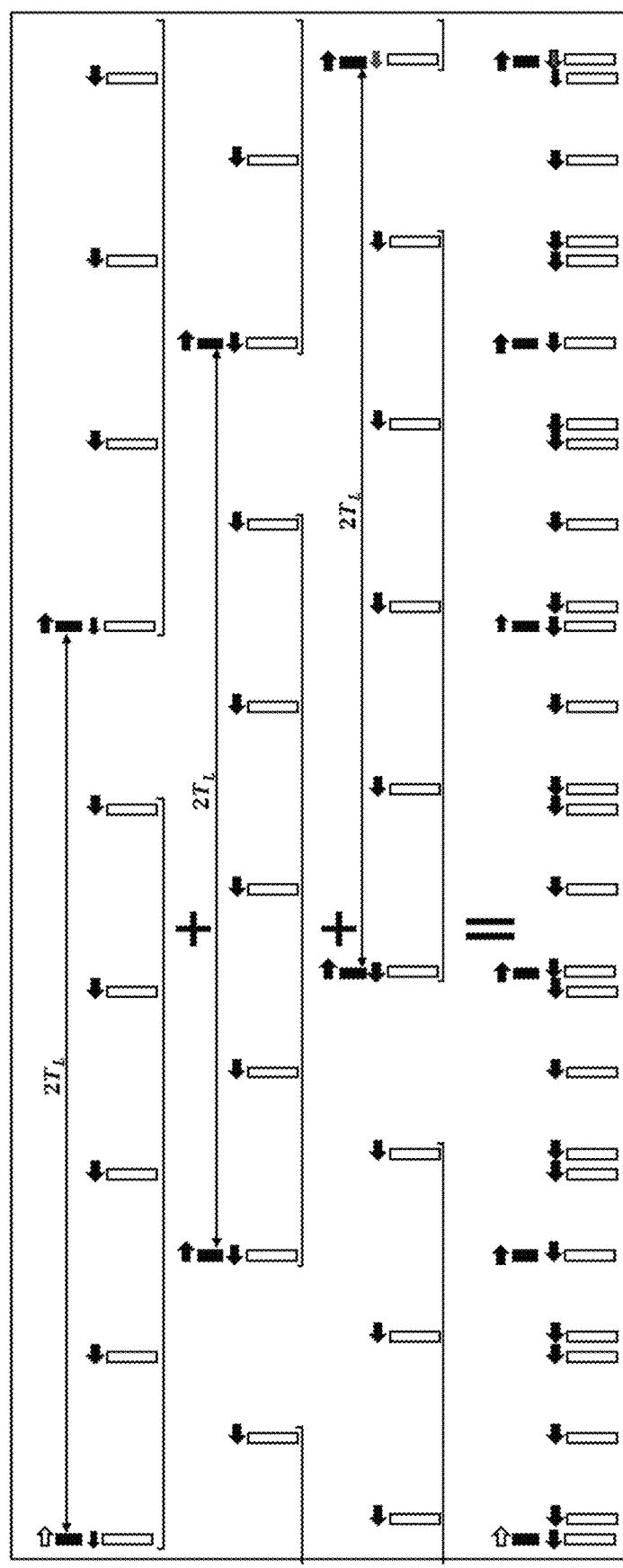
Figure 5A:
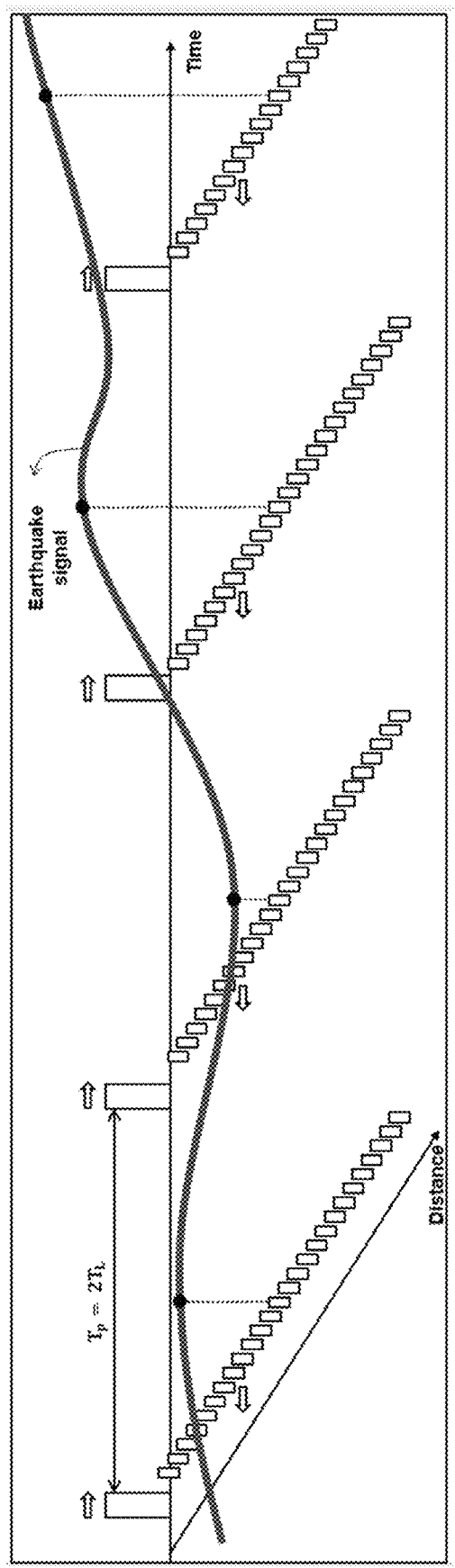
FIG. 5(A) is a schematic illustrating pulse train sent by sensor transmitter and returning pulse trains in which time and distance axes are separately drawn and FIG. 5(B) is a schematic diagram illustrating frequency-domain multiplexing to increase sampling rate in which earthquake occurs at $13^{th}$ span according to aspects of the present disclosure.
Figure 5B:
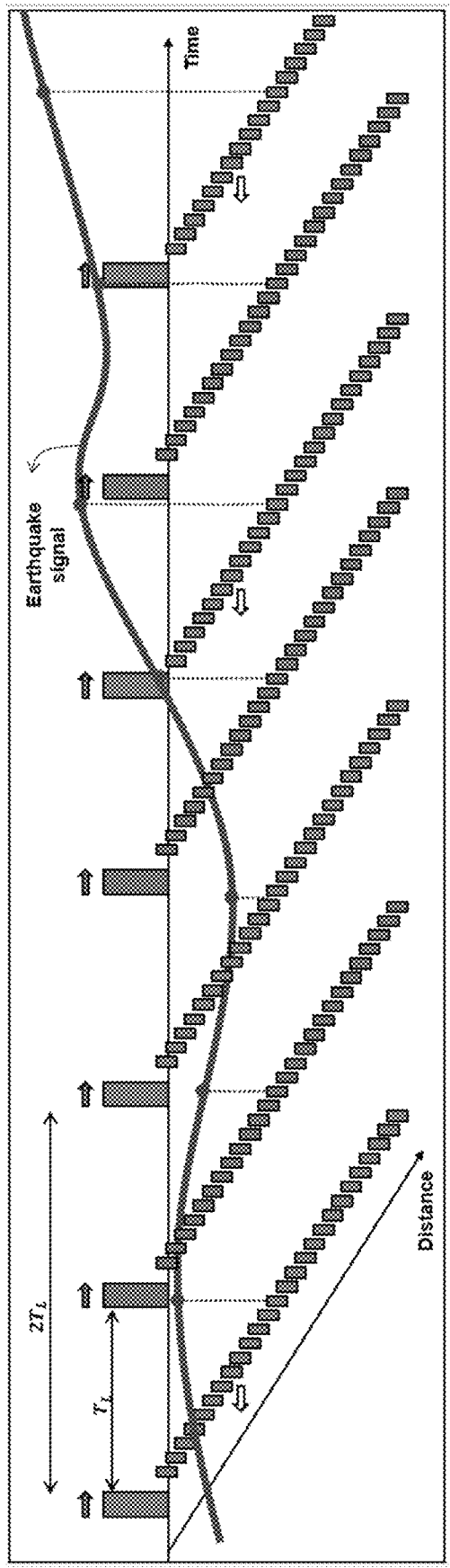

First we explain the TDM. FIG. 4(A) is a schematic illustrating the pulse train sent by the sensor transmitter and the returning pulse trains without multiplexing as explained previously and FIG. 4(B) is a schematic illustrating the time-domain multiplexing to increase sampling rate according to aspects of the present disclosure. Without any multiplexing, as discussed in the previous paragraphs, the transmitter sends pulses with a period of $2T_L$—because we need to wait for the last pulse to return to the receiver. In the case of TDM, within $2T_L$ we send M pulses with M>1. In FIG. (4B) M=3. In this case we send multiple pulses within the time window $2T_L$. The timing of the pulses should be chosen so that they are as uniformly distributed as practical but care should be taken that the return pulses corresponding to different transmitted pulses do not overlap in time. In most cases this can be achieved by choosing the pulse width and the location appropriately, since the span lengths would be known ahead of time The second example is the FDM as shown described in FIG. 5(A) and FIG. 5(B) in which FIG. 5(A) is a schematic illustrating pulse train sent by sensor transmitter and returning pulse trains in which time and distance axes are separately drawn and FIG. 5(B) is a schematic diagram illustrating frequency-domain multiplexing to increase sampling rate in which earthquake occurs at $13^{th}$ span according to aspects of the present disclosure.

In this case, again we send multiple pulses within the time frame of $2T_L$ however, each pulse is sent at a different frequency with little or no overlap between the pulses in frequency domain. The advantage in this case is that, the FDM scheme can be applied to any system with no careful design of when the pulses are sent or requirements on the pulse width. This is because even there is overlap in time between the return pulses corresponding to different frequencies, they can be distinguished based on their frequencies. The disadvantage is that the sensor transmitter and receiver should have high enough bandwidth to accommodate the increased frequency range. Moreover, it would require more complicated signal processing to create and also separate the different frequencies.

The third example is a combination of the TDM and FDM. In this case some pulses might be sent at different frequencies while some others may overlap in frequency but their returning pulses do not overlap in time.

At this point we would like to introduce another aspect of our invention, its resilience to high noise level that may arise from the laser phase noise or environmental noise. While discussing Eq.(2) it was noted that "as long as the laser phase noise is low enough the phase noise imparted by the fiber spans can be measured." Basically in Eq.(2) if the laser phase noise is large enough, the term in the square parenthesis can be quite large, and would bury the phase imparted by the fiber span. In most systems, the "environmental" noise is very low for the fibers that are under water. However, the environmental noise can be large especially where the fiber is out of the water and for instance in the building housing the sensor, or there might be a part of the cable buried under ground between the beach and the housing which might be further in land.

Some of the environmental noise sources could be fans of other equipment running inside housing, or other noisy equipment, or it could be vibration from traffic etc. From here on, we will not separate the environmental noise from the laser phase noise as the sources of these environmental noises are very close in location to the laser, and the effect of these noises can be considered part of the laser phase noise. We will however distinguish the noise added by the laser at the transmitter side vs receiver. For much of the link the delay between the transmitter and receiver is long enough that, we will assume the laser phase noise at the transmitter and receiver are independent even though it is the same laser.

Figure 6A:
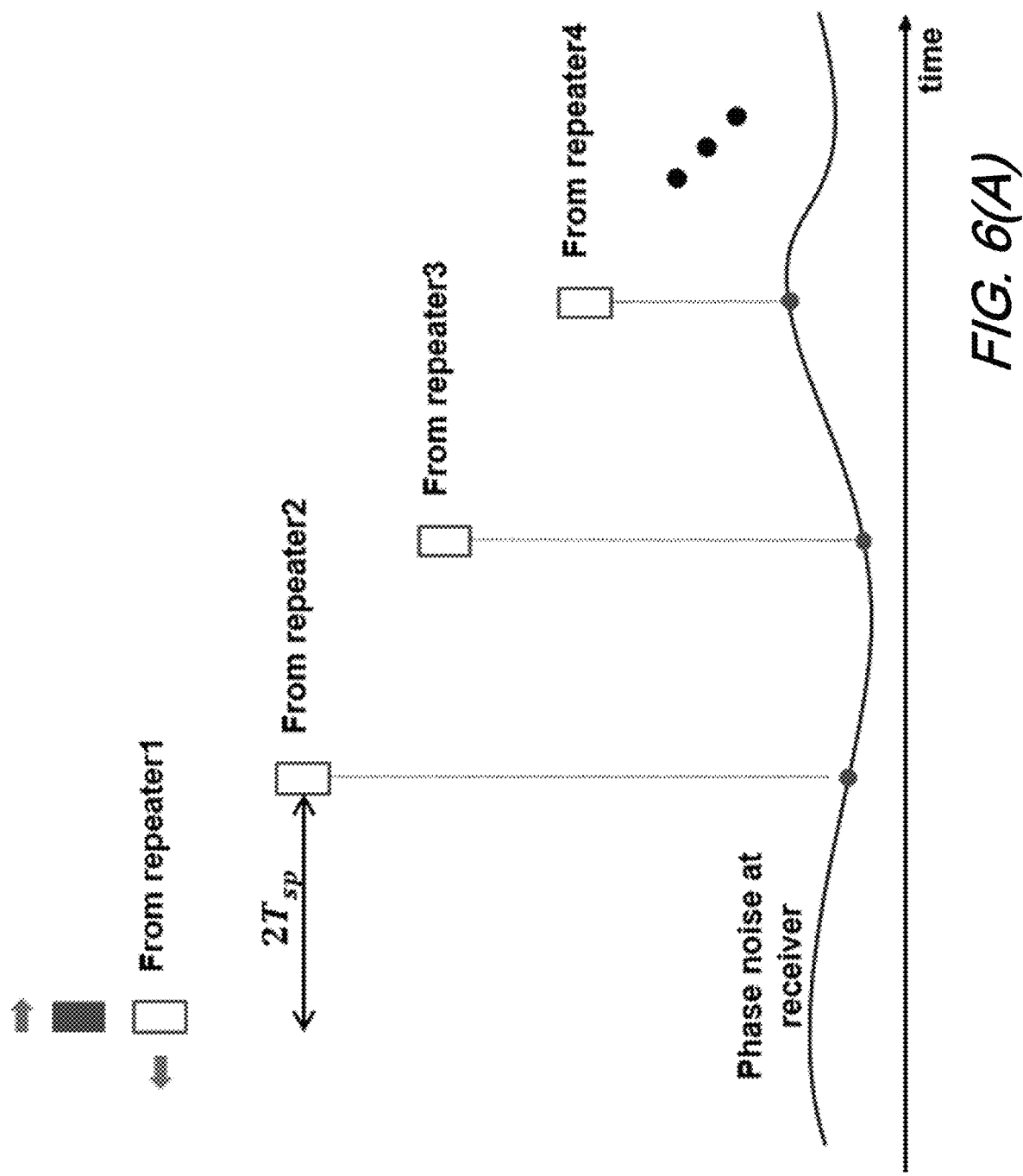
FIG. 6(A) is a schematic diagram illustrating how large phase noise added at a receiver causes large phase noise.
Figure 6B:
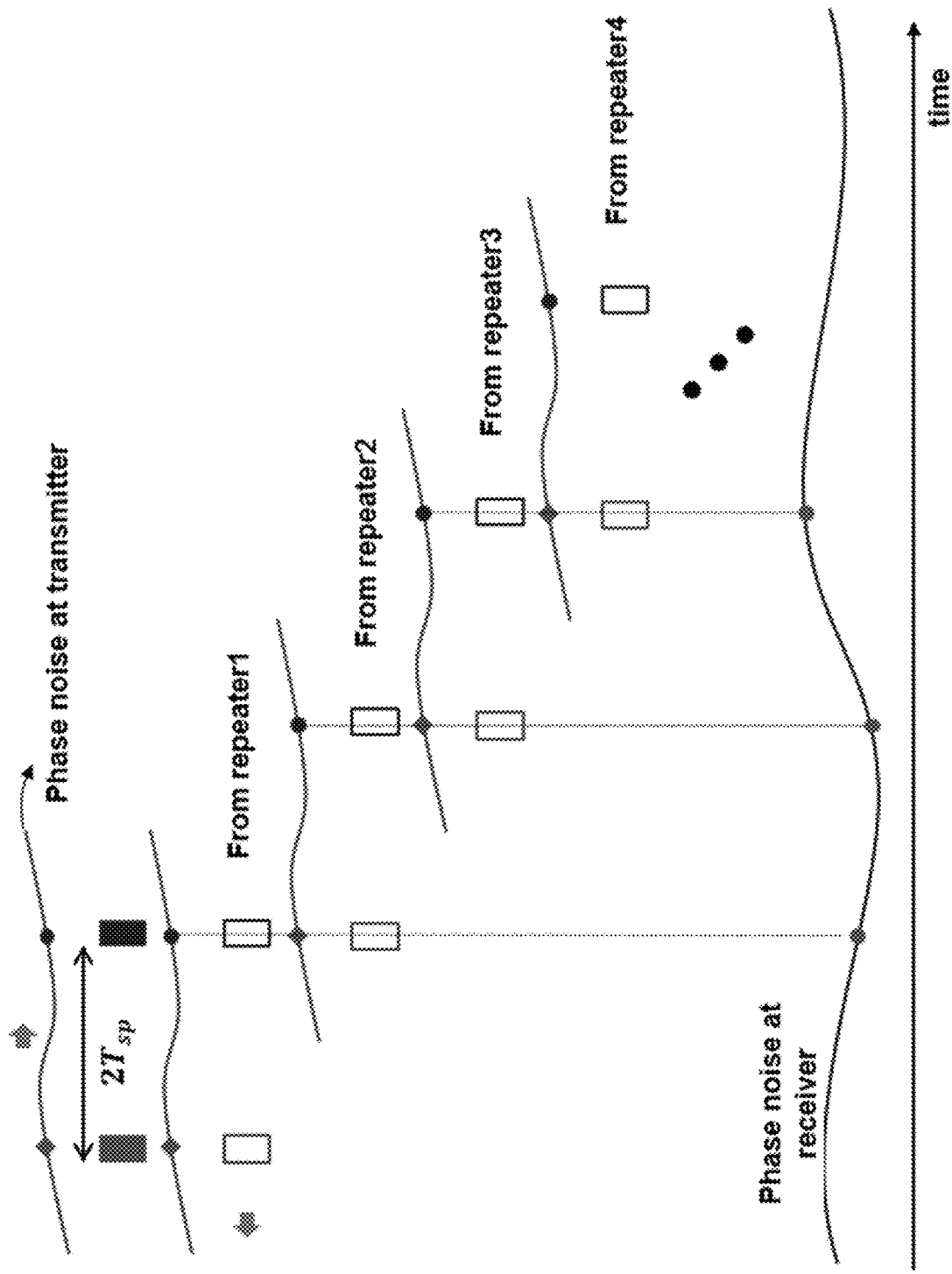
FIG. 6(B) is a schematic illustrating how phase noise may be solved using two-separate pulses of different frequencies separated by a span length or more according to aspects of the present disclosure.

FIG. 6(A) is a schematic diagram illustrating how large phase noise added at a receiver causes large phase noise; FIG. 6(B) is a schematic illustrating how phase noise may be solved using two-separate pulses of different frequencies separated by a span length or more according to aspects of the present disclosure. These figures schematically explain why a large noise at the receiver can be problematic. The solid rectangle shows the transmitter pulse and the empty rectangles show the returning pulses reflected at the repeaters. The x-axis shows the time. As may be observed, the returning pulses pick up phase at times separated by $2T_{sp}$. The dashed lines show that different returning pulses pick up different parts pf the phase noise. If the phase noise is large enough with this separation in time there would be large fluctuations even if there is no disturbance at the link.

FIG. 6(B) explains our solution to removing the phase noise added at the receiver at the expense of increasing the impact of phase noise added at the receiver. We will call this double-pulse double-differential (DPDD) solution. Later we explain that increasing the impact of transmitter noise is acceptable as we introduce a way to remove it. Our solution involves using two pulses that are delayed with respect to each other by an amount that is equal to $T_{sp}$. The two pulses are of different frequencies so that we can distinguish them even if they overlap. We call these pulses the leading and trailing pulses.

Because the delay between the pair of pulses matches the span delay $T_{sp}$, the trailing pulse from the pair reflected from the jth repeater returns at the same time as the leading pulse returning from the (j+1)th repeater. In other words, referring to FIG. (7) the blue pulse returning from repeater j, overlaps in time with the red pulse returning from he (j+1)th red pulse. In this scheme we propose to compare the phase from the trailing pulse from the jth repeater with the leading pulse from the (j+1)th repeater. Similar to the previous case, we will still recover the phase added by the jth span, however, as it can be seen from the figure since they arrive simultaneously at the receiver, they would acquire the same phase noise at the receiver, which would completely cancel. Again the large phase noise at the receiver includes both the environmental noise where the receiver is housed and the laser phase noise.

Even though at this stage the receiver noise is taken care of, we have introduced increased phase noise from the transmitter side. This is because now there is a large delay between the leading and the trailing pulse pair which is $T_{sp}$. Since the laser noise and the environmental noise can be large this may introduce a large and randomly varying phase difference between the pair. To show this, in the figure we included the line which represents the phase noise added at the transmitter side. The diamond and the circles show the phase added to the pulse pair at the transmitter side. At this point it may look like we have just exchanged the impact of a large phase noise at the receiver side with a large noise at the transmitter side. However, a significant difference is that the pulse pair is created just once at the transmitter, and once the pair leaves the transmitter side the phase noise added at the transmitter is fixed and it is shared by all the returning pulses. This is not true for the receiver phase noise. All the returning pulses would acquire a different receiver noise upon returning to the receiver.

We can use this correlation to remove the common noise added at the transmitter side. One way to do this is what we call a double differential. The phase noise added at the transmitter will be the same between the difference of trailing pulse from jth repeater and the leading pulse from the (j+1)th repeater and the difference of trailing pulse from (j+1))th repeater and the leading pulse from the (j+2)th repeater. By taking the difference between these two differences we can eliminate the noise added at the transmitter as well. The end result is that both the phase noise added ant the receiver and the phase noise added at the transmitter are eliminated. However, in this case we end up with the difference of the phase that is added by the (j+1)th span and the jth span instead of just the phase added by the jth span. This means, all the phases recovered are in differential form between consecutive spans. In many cases the differential phase information is sufficient. In other systems, in many cases, not all the spans have large disturbances simultaneously. In those cases, the quite links can be identified and the phase disturbance of the rest of the spans can be found with respect to the quite links. In some cases it is possible to add additional reflectors at the beginning and the end of the links providing one more return pulse compared to the number of spans which would provide the additional data point to unravel the phase for each span.

A second way to use this correlation to remove the large but common noise is to use various correlation techniques to distill the common noise. The most naive of these is taking the simple averaging of the noise recovered from each span, which can be later subtracted from all the phase measurements.

Now we will put the explanation above into mathematical expressions. Since in the case of DPDD we have a pulse pair, a leading and a trailing one, we need to write down the phase accumulate by each separately, which we will call $\phi_{1j}^k$ for the leading pulse and $\phi_{2j}^k$ for the trailing pulse returning from the jth repeater in the kth pulse train. Here we further separate the phase added by the jth forward span and the jth backward span as $\Phi_{Fj}$, and $\Phi_{Bj}$. Similar to Eq.(1) we obtain:

$$\phi_{1j}^k = \Sigma_i{'}[\Phi_{Fi}(kT_p+iT_{sp})+\Phi_{Bi}(kT_p+(2j-i+1)T_{sp})]+\phi_L(kT_p)-\phi_L(kT_p+jT_{sp})+\phi_T(kT_p)+\phi_R(kT_p+jT_{sp}) \quad (3)$$

$$\phi_{2j}^k = \Sigma_i{'}[\Phi_{Fi}(kT_p+(i+2)T_{sp})+\Phi_{Bi}(kT_p+(2j-i+3)T_{sp})]+\phi_L(kT_p+2T_{sp})-\phi_L(kT_p+jT_{sp}+2T_{sp})+\phi_T(kT_p+2T_{sp})+\phi_R(kT_p+(j+2)T_{sp}) \quad (4)$$

In Eqs.(3-4) we further separated the phase noise added by the laser as $\phi_L$, from the phase noise added by the environment at the location of the transmitter as $\phi_T$, and the phase noise added by the environment at the receiver as $\phi_R$. Note that by the environment at the transmitter side or the receiver side it is usually meant the part that is out of the water and therefore more prone to environment noise.

As described above to isolate the phase noise added by a particular fiber pair, e.g., the jth fiber pair, we subtract the phase of the trailing pulse returning from the jth repeater from the leading pulse of the (j+1)th repeater. We call this the differential phase $\delta\phi_j^k$ for the jth repeater in the kth pulse train defined in Eq.(5) as follows:

$$\delta\phi_j^k = \phi_{1(j+1)}^k - \phi_{2j}^k = \Phi_{F(j+1)}(kT_p+(j+1)T_{sp})+\Sigma_i{'}[\Phi_{Fi}(kT_p+iT_{sp})-\Phi_{Fi}(kT_p+(i+2)T_{sp})]+\phi_L(kT_p)-\phi_L(kT_p+2T_{sp})+\phi_T(kT_p)-\phi_T(kT_p2T_{sp}) \quad (5)$$

The first two terms in Eq.(5) shows the phase added only by the (j+1) fiber pair, the terms in the summation shows the accumulated phase difference added by all the previous forward spans between the leading and trailing pulses. In general this term is expected to be very small since the fibers are laid on the seabed which is expected to be very quiey unless disturbed by major disturbances like earthquakes. Even in the case of earthquakes this term is expected to be small since the earthquake vibrations are slow, on the order of Hz, whereas the time difference $T_{sp}$ is on the order or milliseconds or shorter. In other words, the difference between the delayed phase noise, e.g, $\Phi_{Fi}(kT_p+iT_{sp})-\Phi_{Fi}(kT_p+(i+2)T_{sp})$ is effectively a high-pass filter that rejects contribution from frequencies below $1/(2T_{sp})\sim$kHz , whereas most of the power of the earthquake is expected to be below 10 s of Hz.

The last four terms corresponds to the difference in the phase noise added to the leading vs trailing pulse at the transmitter by the laser and also the environmental noise at the transmitter side. Note that all the phase noise added by the local oscillator, i.e., the phase noise added by the laser at the receiver, and the environmental noise added at the receiver side are eliminated. This includes any parasitic noise that might have been added by the backward fibers.

In general, this noise represented by this last four terms is also small and can be neglected, which leads to the case where $\delta\phi_j^k$ becomes equivalent to the phase added by the (j+1)th fiber pair. However, in some cases, the environmental noise added at the transmitter side can be very large. It can also happen that a cheaper or more practical laser might be preferred which happens to have a large phase noise. In such cases the last four terms may dominate preventing recovery of the phase noise added by the fibers only.

It should be noted that the last 4 terms in Eq.(5) are independent of "j" meaning they are the same for all the spans, or for all the $\delta\phi_j^k$. Therefore there are multiple ways to either remove them by looking at the difference between $\delta\phi_j^k$s, or by estimating them and then removing them. In the cases where $\delta\phi_j^k$s are sufficiently statistically independent, the common noise can be estimated by performing a simple averaging over $\delta\phi_j^k$s. The other way to remove this noise is performing what we call double differential $\Delta\phi_j^k$ which is defined as $$\Delta\phi_j^k = \delta\phi_j^k - \delta\phi_{(j-1)}^k \quad (6)$$

We call it double differential because it is a differential on $\delta\phi_k^k$, and $\delta\phi_j^k$ itself was obtain by taking a differential on the phases of the received pulses. Using Eq.(5) the double differential phase can be expressed as:

$$\Delta\phi_j^k = \Phi_{F(j+1)}(kT_p+(j+1)T_{sp})+\Phi_{B(j+1)}(kT_p+((j+2)T_{sp})-[\Phi_{Fj}(kT_p+(j+2)T_{sp})+\Phi_{Bj}(kT_p+(j+1)T_{sp})] \quad (7)$$

In Eq.(7) now only phase terms added by the fibers are left, meaning all the noise added by the laser and the environmental noise either at the transmitter side or the receiver side are eliminated. As noted above, the noise added at the ocean bottom should be slow enough therefore we can make the following assumptions:

$$\Phi_{Fj}(t) \approx \Phi_{Fj}(t+T_{sp}), \Phi_{Bj}(t) \approx \Phi_{Bj}(t+T_{sp}) \quad (8)$$

Further if we define $\Phi_{FBj}(t)=\Phi_{Fj}(t)+\Phi_{Bj}(t)$ as the phase noise added by the jth fiber pair at time t, we can express Eq.(7) in a simplified form as follows:

$$\Delta\phi_j^k = \Phi_{FB(j+1)}(kT_p)+(j+2)T_{sp})-\Phi_{FBj}(kT_p+(j1)T_{sp}) \quad (9)$$

A second way to use this correIn the case of ocean bottom earthquake, the vibrations of the earthquake causes phase variations in different spans. These phase variations are expected to be uncorrelated to some degree. The difference in the phase induced by the earthquake on the neighboring spans can be read out from the $\Delta\phi_j^k$ as it can be seen from Eq.(9). This would localize the earthquake to within two span lengths. However, this localization can be improved in the most general case, where many of the spans are not affected by the earthquake. Using the undisturbed spans as the reference, the rest of the disturbance can be unraveled.

Above we explained several separate things. One of them was how to increase the sampling rate. We gave TDM and FDM as examples. Another one was explaining the double-pulse double-differential technique. It is rather straightforward to see that these two can be combined as they may become necessary. For instance in the case of double-pulse for every sampling point we need two pulses at two different frequencies. If we combine this case with FDM which increases the sampling rate by a factor of M, we would need to employ a total of 2M frequencies.

Figure 7:
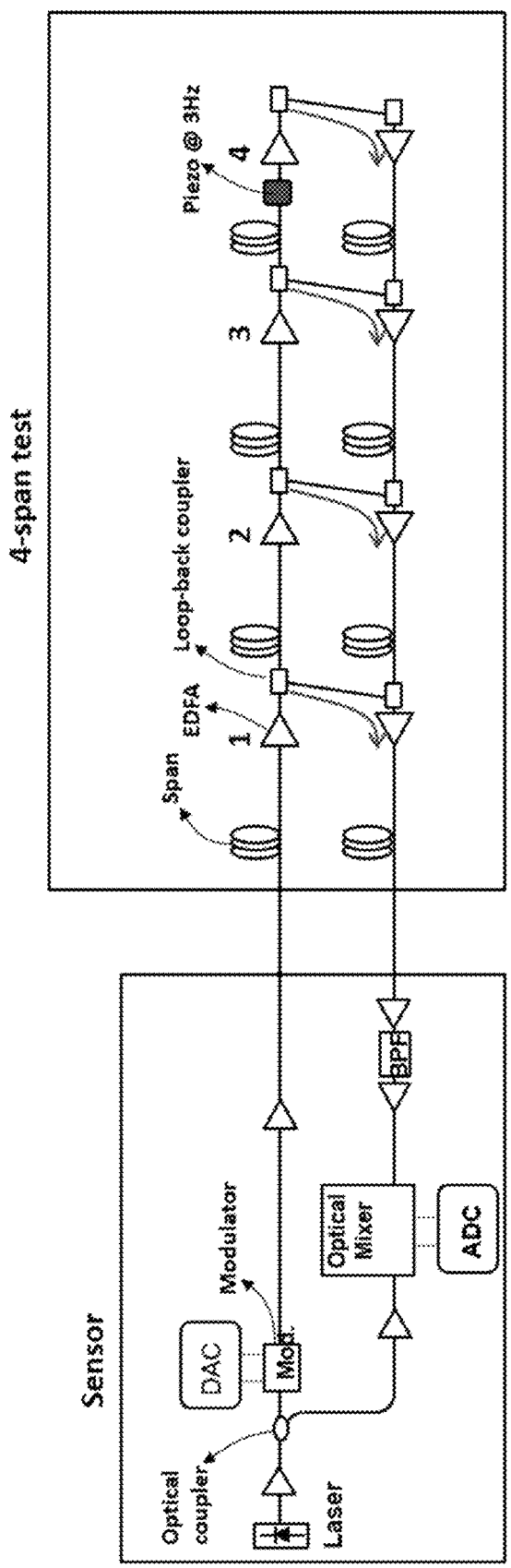
FIG. 7 is a schematic block diagram of an illustrative experimental setup for testing a double-pulse double differential phase sensing according to aspects of the present disclosure.
Figure 8:
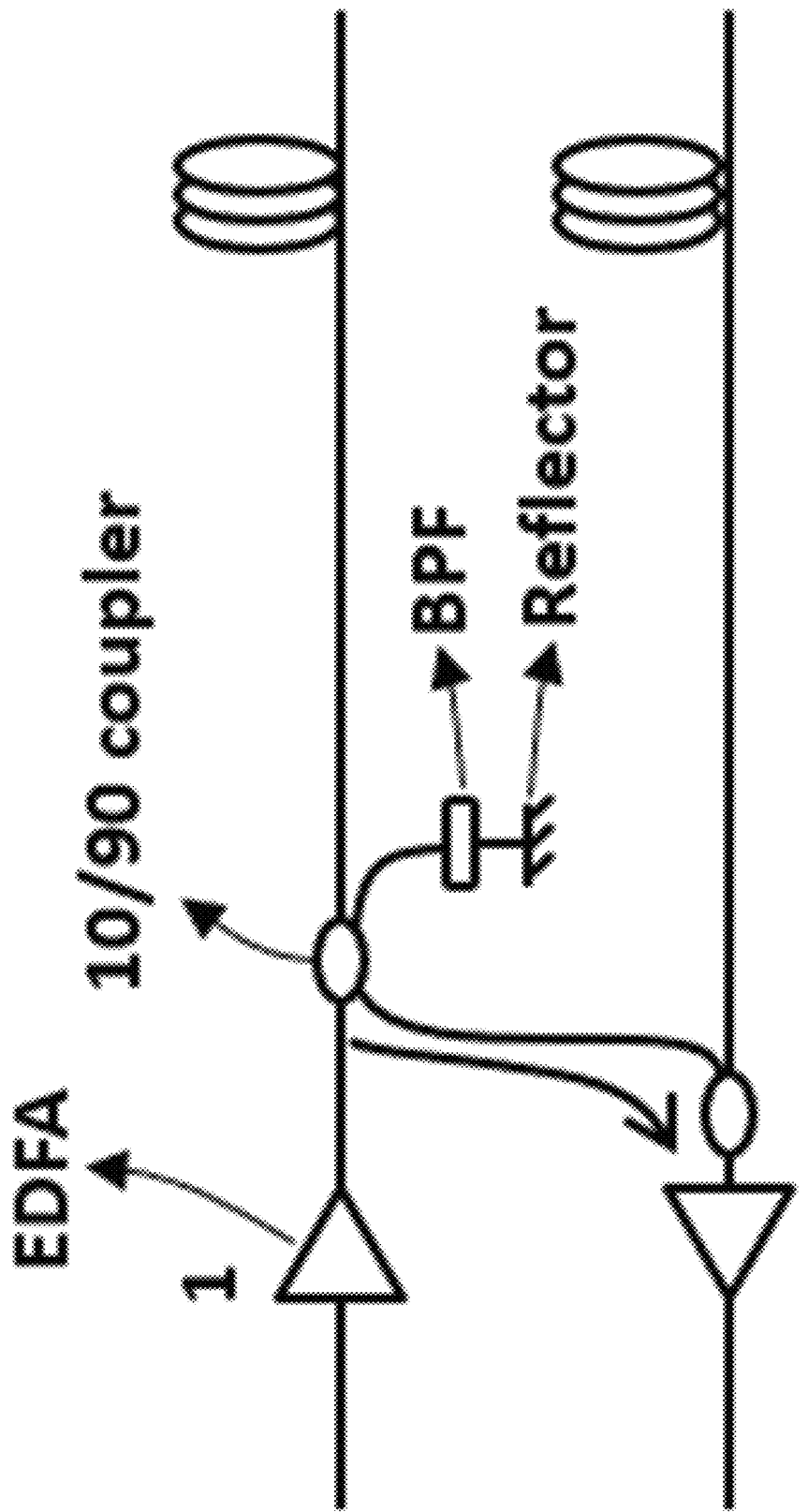
FIG. 8 is a schematic block diagram of an illustrative loop-back coupler configuration in which an EDFA is followed by a 2×2 10/90 coupler such that the path between the amplifier and the span is 90% pass and the 10% arm goes through a band-bass filter, gets reflected and back to the 10/90 coupler wherein 90% of the reflected light couples back to the back ward direction through the 10% port of a 11×2 10/90 coupler at the input of the amplifier according to aspects of the present disclosure.

FIG. 7 is a schematic block diagram of an illustrative experimental setup for testing a double-pulse double differential phase sensing according to aspects of the present disclosure. A low phase noise laser light is amplified and split into two parts. One part is connected to the optical mixer and act as the local oscillator. The other part goes into an optical modulator that is connected to a digital to analog convertor that produces the required pulse shape and frequency. After the pulse or pulses are generated at the modulator they are amplified and sent to the 4 span link. The spans are 50-km-long standard single mode fibers with 0.2 dB/km attenuation. After the spans erbium-doped fiber amplifiers (EDFAs) are placed to compensate for the span loss. Amplifier is followed by the loop-back coupler setup. The particular loop-back coupler set up used in the experiment is described in FIG. 8—which is a schematic block diagram of an illustrative loop-back coupler configuration in which an EDFA is followed by a 2×2 10/90 coupler such that the path between the amplifier and the span is 90%pass and the 10% arm goes through a band-bass filter, gets reflected and back to the 10/90 coupler wherein 90% of the reflected light couples back to the back ward direction through the 10% port of a 11×2 10/90 coupler at the input of the amplifier according to aspects of the present disclosure. As mentioned earlier, this is not the only way to implement a loop-back path, and our invention would work on other loop-back path designs as well. On the $4^{th}$ span, a piezo is added for inducing sinusoidal phase modulation on the fiber. The piezo is driven at 3 Hz, and emulating earthquake.

Even the test setup was prepared with only 4 spans, we wanted to find out whether our invention would work for a system much longer. For instance with 4 spans of 50 kms that is 200 km in total, the fundamental sampling frequency would be ~500 Hz. However, we set the fundamental sampling frequency to 20 Hz, which would correspond to that of a 5000 km link. At this low sampling frequency, it is found that the fundamental sampling frequency is too low. We increased the sampling frequency by employing FDM method. We used 50 separate frequencies, which effectively increased the sampling frequency back to 1 kHz. Further, in order to employ the double-pulse double differential phase sensing method we doubled the number of FDMs as explained above. As a result we generated a total of 2×50 pulses at different frequencies and staggered in time domain as explained above in the text. In the experiment, the FDM frequencies are separated by 16 kHz, and pulse width is set to 0.5 ms.

Figure 9A:
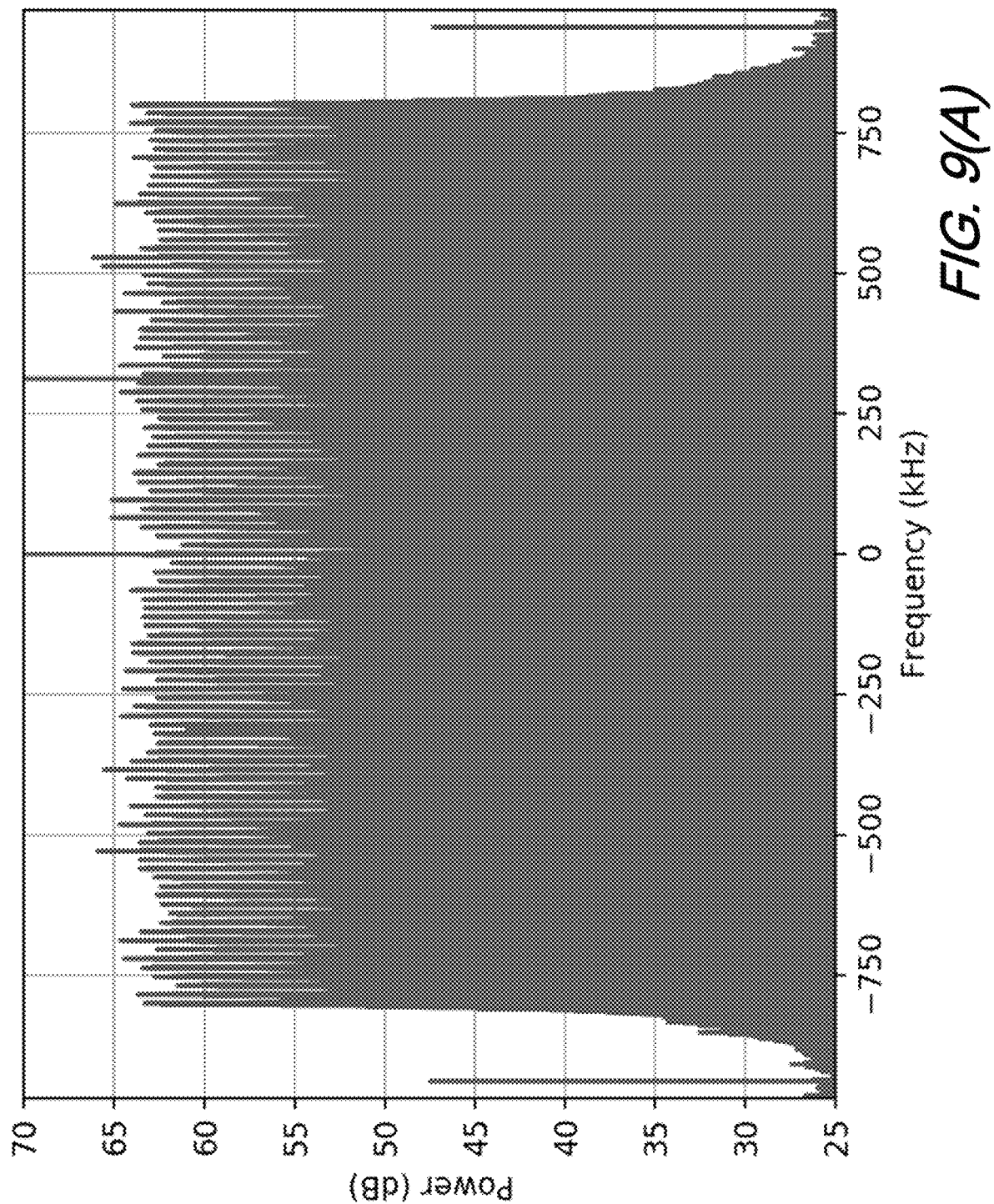
FIG. 9(A) is a plot showing spectrum of FDM pulses sampled by the A/D converter (ADC) at the receiver with 50 FDM peaks on the negative side and matching 50 on the positive side are used to create the double pulses and FIG. 9(B) is a plot illustrating a close-up of FIG. 9(A) according to aspects of the present disclosure.
Figure 9B:
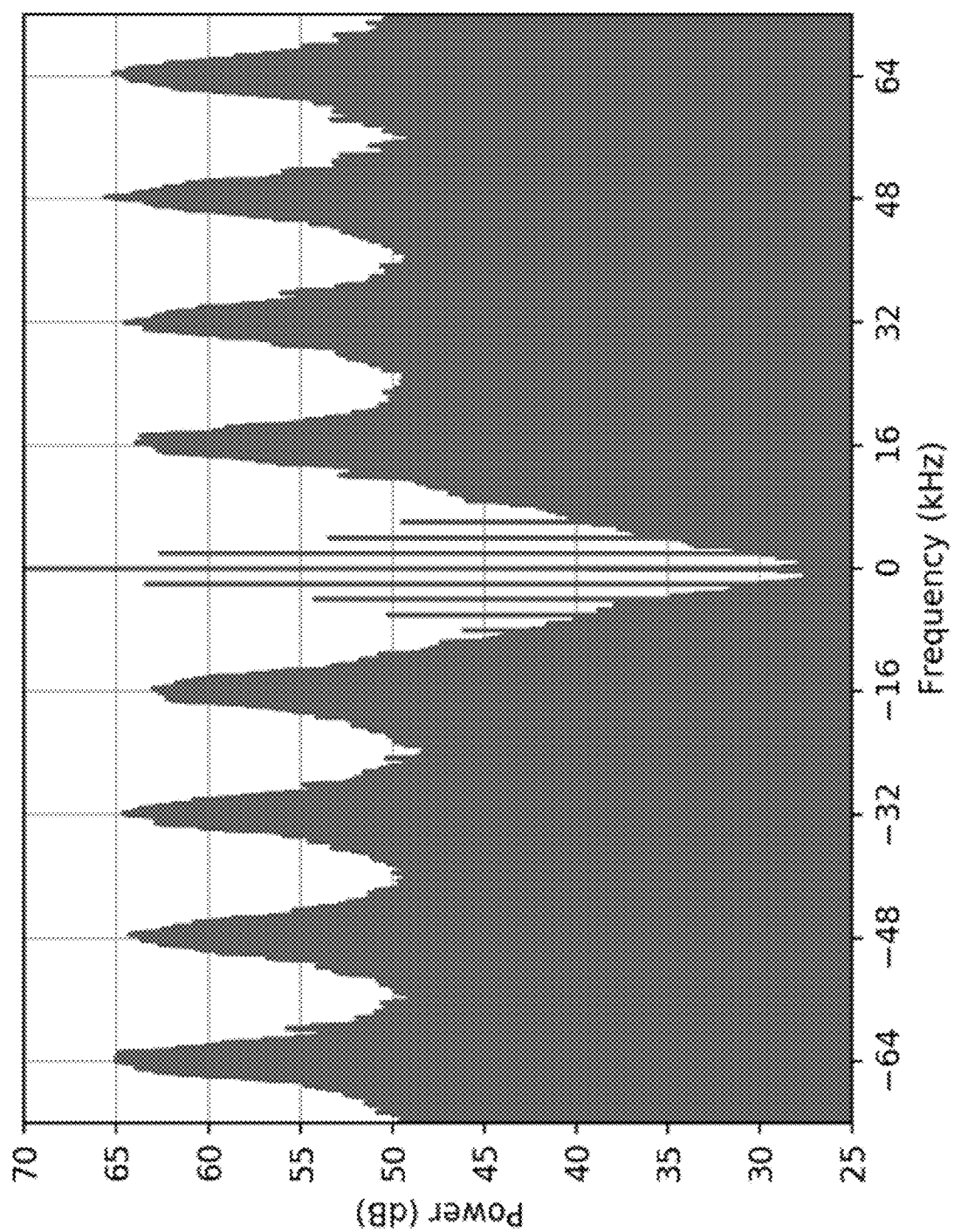

FIG. 9(A) is a plot showing spectrum of FDM pulses sampled by the A/D converter (ADC) at the receiver with 50 FDM peaks on the negative side and matching 50 on the positive side are used to create the double pulses and FIG. 9(B) is a plot illustrating a close-up of FIG. 9(A) according to aspects of the present disclosure; and shows the spectrum of the 2×50 FDM as it is received by the ADC.

Figure 10:
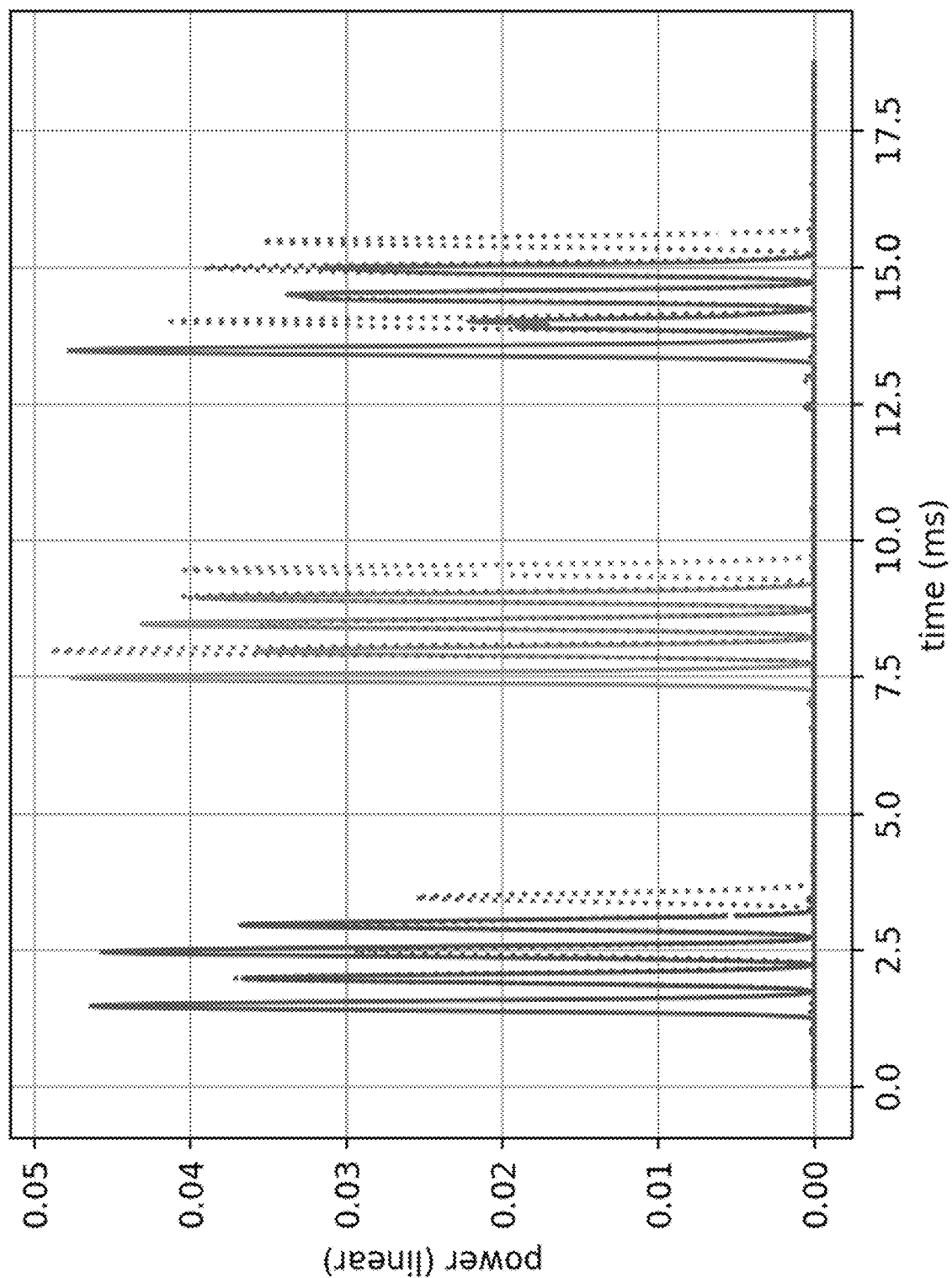
FIG. 10 is a plot showing 4 returning pulses from the reflectors after the 4 repeaters for 3 of the FDM pulses according to aspects of the present disclosure.

FIG. 10 is a plot showing 4 returning pulses from the reflectors after the 4 repeaters for 3 of the FDM pulses according to aspects of the present disclosure wjereom the solid pulses correspond to pulses with different frequencies in the context of FDM and are the leading pulse. The dashed pulses corresponds to the trailing pulses. It can be seen that the trailing pulse overlaps with the leading pulse from the next repeater. However, since they are of different frequency, they can be distinguished based on their frequency.

Note that if we ignore the trailing pulses for instance, we can consider this a single-pulse single differential scheme. First we process the received data according to Eqs.(1-2) which corresponds to the single differential scheme where we just ignore the trailing pulses.

Figure 11A:
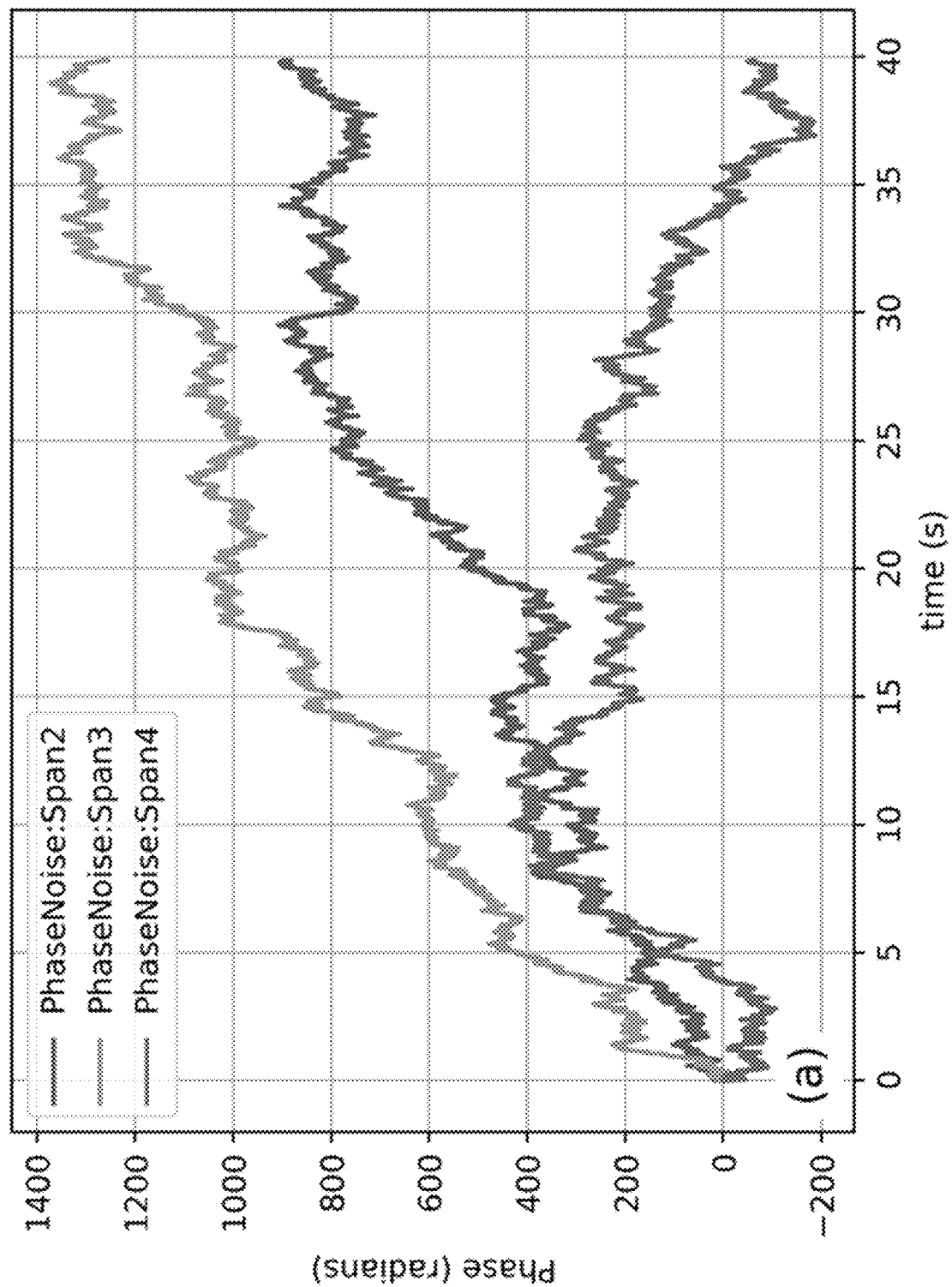
FIG. 11(A) is a plot illustrating phase of spans 2-4 recovered using single differential method.
Figure 11B:
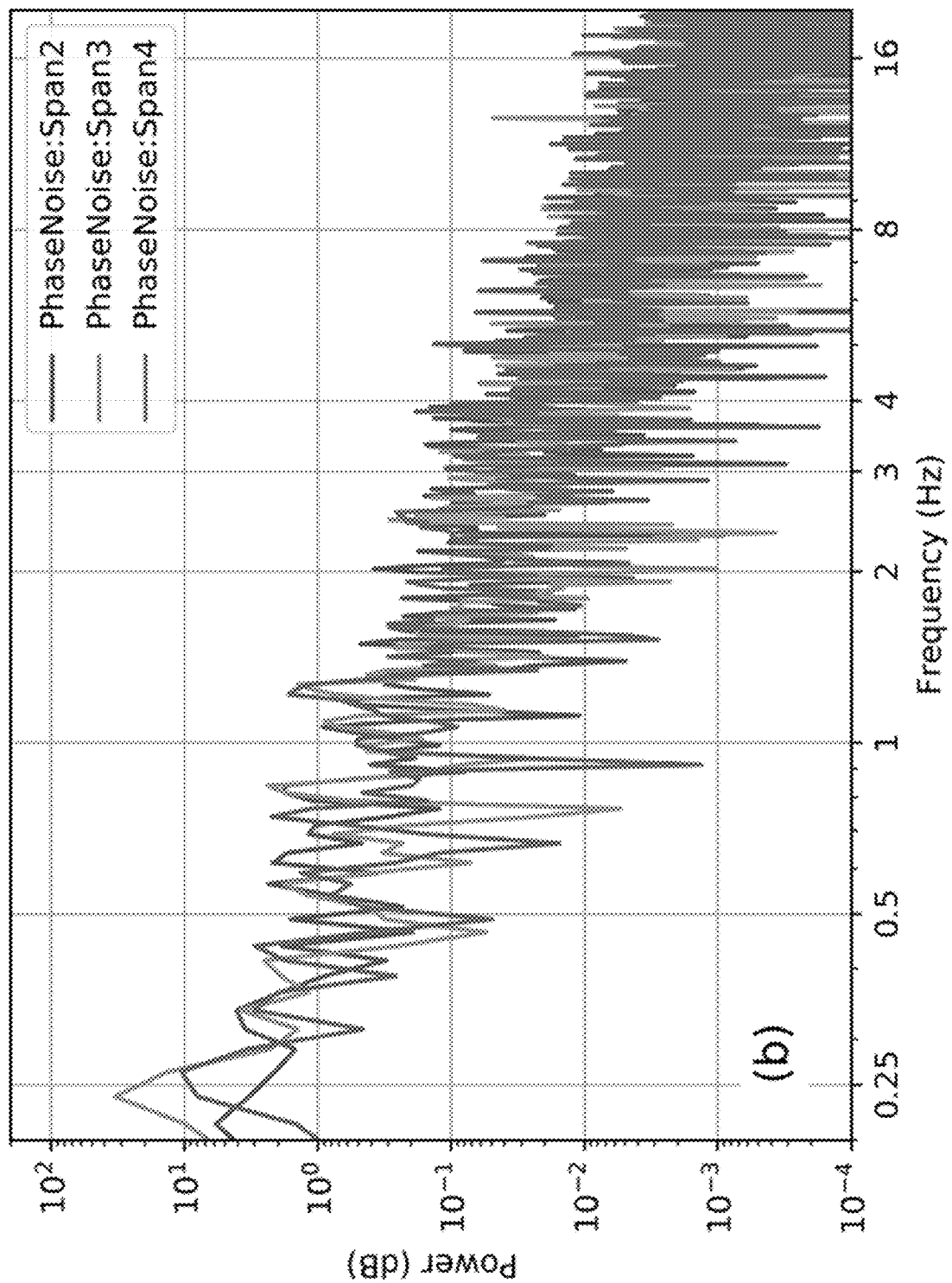
FIG. 11(B) is a plot pf spectra of phase of spans 2-4 recovered using the dingle differential method according to aspects of the present disclosure.
Figure 12A:
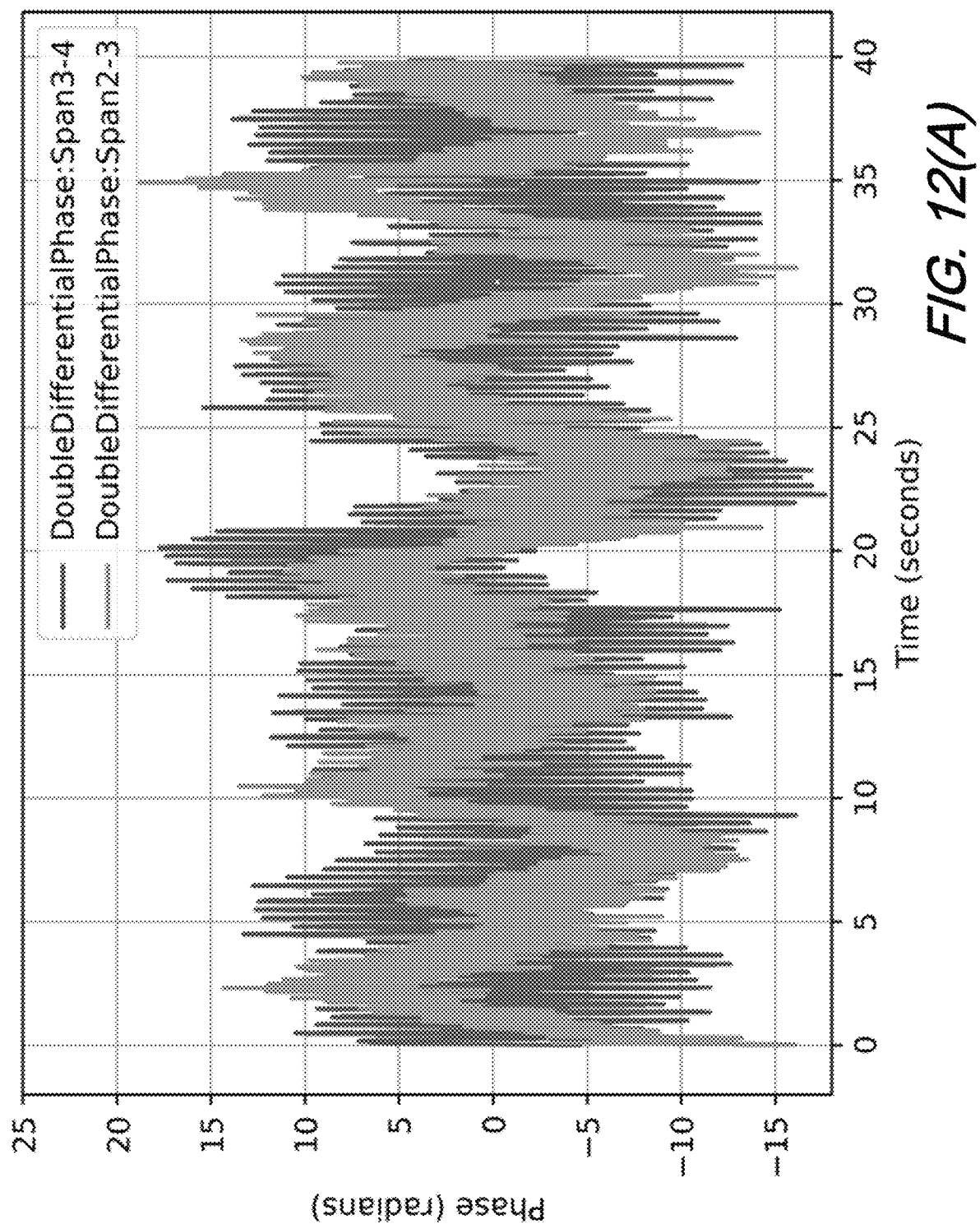
FIG. 12(A) is a plot illustrating differential phase between spans 3-4 recovered using double-pulse double differential method.
Figure 12B:
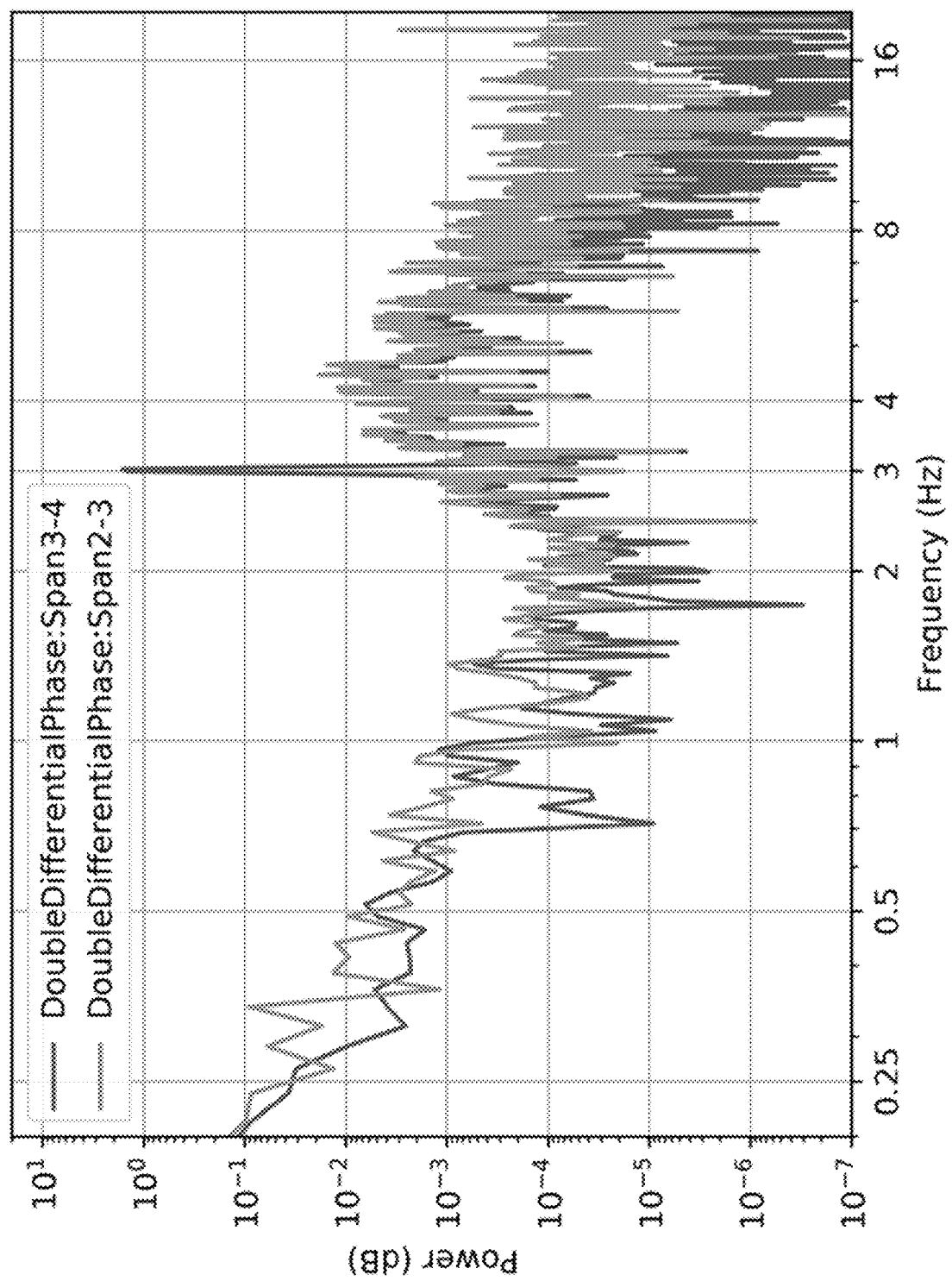
FIG. 12(B) is a plot spectrum of traces in FIG. 12(A) according to aspects of the present disclosure.

FIG. 11(A) is a plot illustrating phase of spans 2-4 recovered using single differential method and; FIG. 11(B) is a plot pf spectra of phase of spans 2-4 recovered using the dingle differential method according to aspects of the present disclosure. FIG. 11(A) shows the phase trace using the single-differential method. It can be seen in this figue that the 3 Hz sinusoidal phase modulation induced using piezo on the $4^{th}$ span is not noticeable. The spectra of the phase traces are shown in FIG. 11(B). The sinusoidal tone at 3 Hz cannot be discerned FIG. 12(A) is a plot illustrating differential phase between spans 3-4 recovered using double-pulse double differential method and; FIG. 12(B) is a plot spectrum of traces in FIG. 12(A) according to aspects of the present disclosure. As noted, the FIG. shows the differential phase traces obtained using the DPDD method. In both time domain and in frequency domain the 3 Hz modulation can be clearly seen. Clearly the DPDD method was able to eliminate the environmental noise and the laser phase noise sufficiently that the induced modulation was measurable.

We described part of our invention in terms of using double pulses with each having a different frequency, since it is easier to explain and visualize. However, this is just one way to implement this invention. The main idea is that the we use extended pulses, in the sense that these pulses are longer in extent than $2T_{sp}$ and the parts extending outside of the span length is distinguishable in some form, eg, their frequency. Another way to achieve this is using long continuous pulses of length $T_w \approx 4T_{sp}$ with a chirp on it. Chirp means the frequency of the pulse varies across it in time domain. A simplest example is the frequency varies linearly across the pulse.

Figure 13:
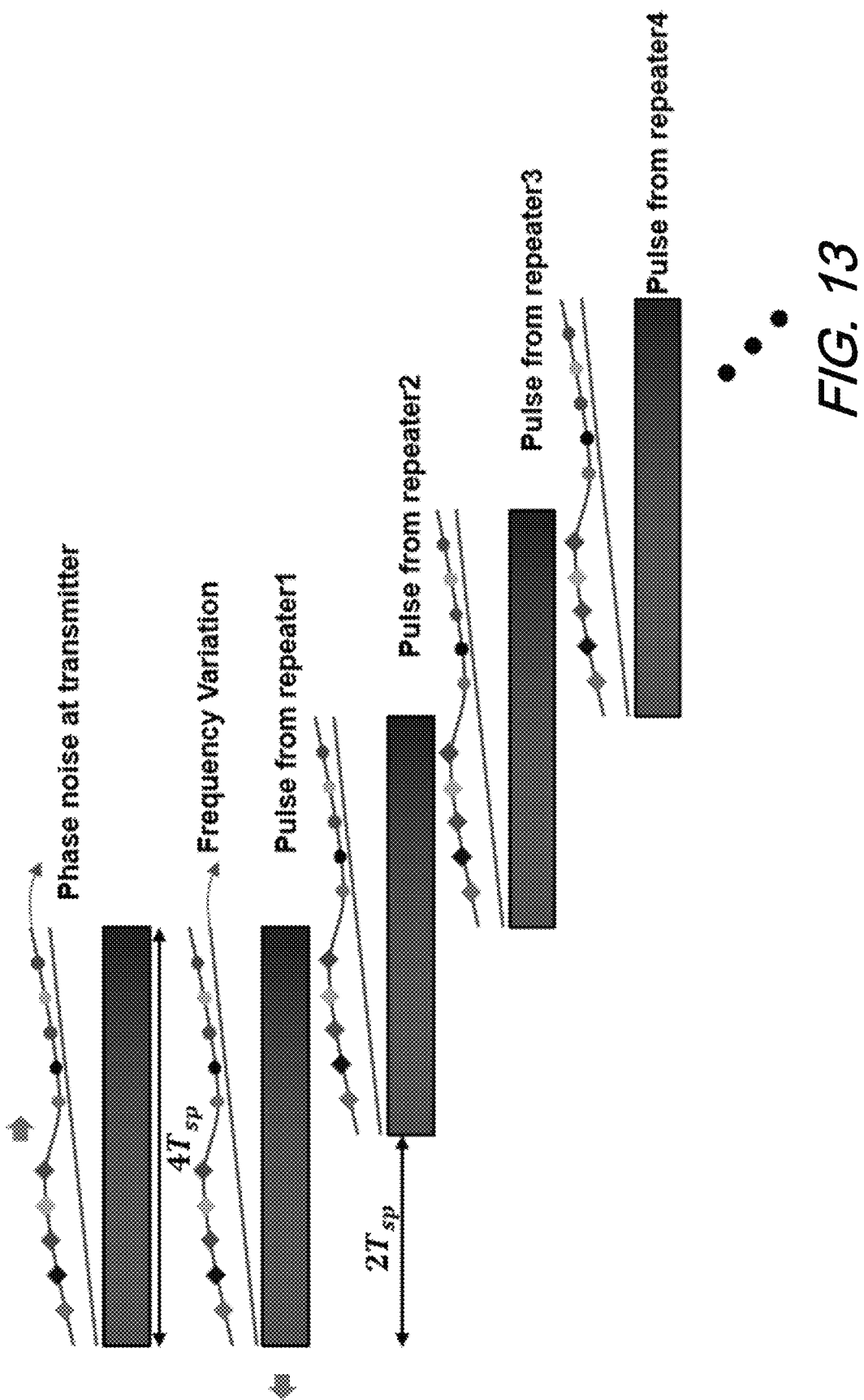
FIG. 13 is a schematic illustrating long-chirped pulse technique in which pulses are longer than 2Tsp and the frequency of the pulse varies along its length and shown further a linear increasing frequency according to aspects of the present disclosure.

FIG. 13 is a schematic illustrating long-chirped pulse technique in which pulses are longer than 2Tsp and the frequency of the pulse varies along its length and shown further a linear increasing frequency according to aspects of the present disclosure. By inspecting FIG. (13) it can be seen why the double pulse technique is a subset of the long-chirped pulse technique. Carving two short pulses out of the long-chirped pulse separated by $2T_{sp}$ would indeed generate a double-pulse configuration. In fact no need for carving, only sampling and processing at those points would produce the same results. It can also be seen that the trailing part of the pulse from repeater j, coincides with the leading edge of the pulse returning from the (j+1)th repeater. Moreover, these two overlapping sections can be separated based on their frequency difference, just like in the case of the double-pulse case.

An advantage of the long-chirped pulse case over double pulse case is for cables that do not have uniform span length along the cable. Though most cables are designed with span lengths almost constant along its length, some spans may be shorter than others. In such cases we would not need to worry the separation between the double-pulses, but in the case of long-chirped pulses, they would still overlap. In fact, we would have three consecutive pulses overlap, nevertheless, we can still tell them apart due to the frequency varying over the pulse length.

At this point, while we have presented this disclosure using some specific examples, those skilled in the art will recognize that our teachings are not so limited. Accordingly, this disclosure should be only limited by the scope of the claims attached hereto.

The invention claimed is:

1. An earthquake sensing method comprising:
   providing a submarine/undersea fiber optic communications system, the fiber optic communications system comprising a forward fiber and a backward fiber, the forward fiber and the backward fiber each including a plurality of spans of optical fiber, each span of the plurality of spans having a repeater, each repeater configured to receive optical signals, separate a portion of the received optical signals, and redirect the separated portion to the backward fiber;
   providing a sensor transmitter and a sensor receiver, the sensor transmitter in optical communication with the forward fiber, and the sensor receiver in optical communication with the backward fiber, the sensor transmitter configured to generate optical signals and apply the generated optical signals to the forward fiber, the sensor receiver configured to receive, from the backward fiber, portions of the generated optical signals separated by the repeaters; and
   determining, from the received portions of the optical signals, seismic activity including earthquakes affecting the submarine/undersea fiber optic communication system;
   wherein the sensor transmitter and sensor receiver operate using a double-pulse, double-differentiation technique.

* * * * *